United States Patent
Ashari et al.

(10) Patent No.: US 11,799,536 B2
(45) Date of Patent: Oct. 24, 2023

(54) MOBILITY-AWARE ANTENNA BEAM TRACKING FOR MOVING COMMUNICATION DEVICES

(71) Applicants: Jalal Khamse Ashari, Ottawa (CA); Amine Maaref, Ottawa (CA)

(72) Inventors: Jalal Khamse Ashari, Ottawa (CA); Amine Maaref, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/027,905

(22) Filed: Sep. 22, 2020

(65) Prior Publication Data

US 2022/0094417 A1 Mar. 24, 2022

(51) Int. Cl.
| | |
|---|---|
| *H04B 7/08* | (2006.01) |
| *H04W 16/28* | (2009.01) |
| *H04B 7/0417* | (2017.01) |
| *H04B 7/06* | (2006.01) |

(Continued)

(52) U.S. Cl.
CPC ........... *H04B 7/086* (2013.01); *H04B 7/0417* (2013.01); *H04B 7/0617* (2013.01); *H04W 4/027* (2013.01); *H04W 16/28* (2013.01); *H04W 92/18* (2013.01)

(58) Field of Classification Search
CPC .... H04B 7/086; H04B 7/0617; H04B 7/0417; H04B 7/0695; H04B 7/088; H04B 7/0626; H04B 7/0408; H04B 7/0632; H04B 7/0452; H04B 7/0634; H04B 7/0413;

(Continued)

(56) References Cited

U.S. PATENT DOCUMENTS

| | | | | |
|---|---|---|---|---|
| 2016/0047884 | A1* | 2/2016 | Zhang | G01S 5/0284 342/458 |
| 2016/0381596 | A1* | 12/2016 | Hu | H04B 7/0617 370/236 |
| 2017/0223744 | A1* | 8/2017 | Qian | H04W 16/28 |

(Continued)

FOREIGN PATENT DOCUMENTS

| | | |
|---|---|---|
| CN | 106297229 A | 1/2017 |
| CN | 109495140 A | 3/2019 |

OTHER PUBLICATIONS

3rd Generation Partnership Project; Technical Specification Group Radio Access Network; Study on New Radio (NR) access technology, Release 15 (V15.0.0); Jun. 2018; 74 pages.

(Continued)

*Primary Examiner* — Fred A Casca

(57) ABSTRACT

Moving communication devices present challenges for conventional antenna beam sweeping techniques. According to embodiments of mobility-aware antenna beam tracking as disclosed herein signaling is communicated between a User Equipment (UE) and a moving communication device in a wireless communication network. The signaling is indicative of a beam trajectory along which an antenna beam, that is associated with the moving communication device, is moving. The moving communication device itself is also moving, along a device trajectory that may or may not be the same as the beam trajectory. The antenna beam is used for subsequent directional communications between the UE and the moving communication device.

31 Claims, 8 Drawing Sheets

(51) Int. Cl.
*H04W 4/02* (2018.01)
*H04W 92/18* (2009.01)

(58) Field of Classification Search
CPC .... H04B 7/0469; H04W 16/28; H04W 4/027; H04W 92/18; H04W 72/046; H04W 24/10
See application file for complete search history.

(56) References Cited

U.S. PATENT DOCUMENTS

| | | | |
|---|---|---|---|
| 2018/0343605 A1* | 11/2018 | Wu | H04B 7/088 |
| 2021/0194551 A1* | 6/2021 | Raghavan | H04B 7/0665 |
| 2022/0046612 A1* | 2/2022 | Ma | H04L 5/003 |

OTHER PUBLICATIONS

MediaTek Inc., On Idle Mode Procedures in NR-NTN, 3GPP TSG-RAN WG2 Meeting #111-e, R2-2006642, Online, Aug. 17, 28, 2020, 8 pages.

* cited by examiner

MOBILITY-AWARE ANTENNA BEAM TRACKING FOR MOVING COMMUNICATION DEVICES

FIELD

This application relates generally to communications, and in particular to communications that involve communication devices that are moving.

BACKGROUND

According to the current Third Generation Partnership Project (3GPP) standard for $5^{th}$ Generation (5G) New Radio (NR), a "beam sweeping" mechanism is executed to initially determine a best transmit-receive beam pair for each User Equipment (UE). That is, a Base Station (BS) or Transmission Reception Point (TRPs) should transmit multiple Synchronization Signal Blocks (SSBs), each using a distinct beam in a different direction. Then the UE should take measurements, of Reference Signal Received Power (RSRP) for example, in different directions to determine the best transmit-receive beam pair. Channel State Information (CSI) for the best beam/TRP is then reported back to the network.

A beam tracking/refinement procedure then should be running to cope with changes in UE position and to align the beam on a per-UE basis. That is, the selected TRP(s) may repeatedly transmit UE-specific Channel State Information Reference Signal (CSI-RS) with narrower beam-width to the UE to keep track of the accurate UE direction. The CSI-RS may sweep a narrower range of directions centered on the initially found UE direction. The beam sweeping procedure should be repeated in all directions in case a beam failure occurs.

These procedures impose a considerable overhead on both the UE and the BS/TRP(s), especially in a rapidly changing environment as in the case of aerial TRPs or otherwise moving TRPs for example.

SUMMARY

An aerial TRP (aTRP) is an example of a moving network device, and may also be referred to as an airborne TRP or a Non-Terrestrial TRP (NT-TRP). The present disclosure is not in any way limited solely to aTRPs. Features disclosed herein may be applied, for example, to embodiments for any one or more of: uplink communications between a UE and a network device such as a TRP, downlink communications between a UE and a network device such as a TRP, and sidelink communications between UEs.

For the sake of power economy, it may be preferred that an aTRP such as a drone constantly moves with at least a minimum velocity, rather than hovering at a fixed location. This additional mobility introduces more complexity to beam tracking in integrated terrestrial and Non-Terrestrial Networks (NTN). Moreover, each aTRP may be configured to fly in a different direction. For a particular UE with a certain mobility pattern, it might be preferred to establish a connection to a particular aTRP that has a similar flight trajectory and is moving in the same direction as the UE. In other words, based on relative velocities between each UE and different TRPs, each UE should preferably connect to a certain aTRP. A UE in an idle mode, however, may connect to an aTRP that is moving in a different direction, if RSRP or another form of signal power is the only measure that is used for beam/TRP selection for example.

After a UE is connected to an aTRP, a beam misalignment may occur, even when applying a per-UE beam-tracking mechanism, because of (a) difficulty in achieving an accurate estimate of UE location/mobility especially at the aTRP, (b) the need to implement a low-complexity beam tracking mechanism on aTRPs, and (c) the need to update the receive beam direction, even for a stationary UE, while the aTRP adjusts transmit beam direction.

Embodiments disclosed herein provide for mobility-aware beam tracking that takes into account a beam trajectory of an antenna beam that is associated with a moving communication device. A moving communication device may be a network device such as an aTRP or another UE, for example.

One aspect of the present disclosure relates to a method that involves communicating signaling between a UE and a moving communication device in a wireless communication network. The signaling is indicative of a beam trajectory along which an antenna beam, that is associated with the moving communication device, is moving. The moving communication device itself is moving along a device trajectory, which may be the same as or different from the beam trajectory. Such a method may also involve using the antenna beam for subsequent directional communications between the UE and the moving communication device.

According to another aspect of the present disclosure, an apparatus includes a communication interface; a processor coupled to the communication interface; and a non-transitory computer readable storage medium, coupled to the processor, storing programming for execution by the processor. The programming includes instructions to, or to cause the processor to, communicate between a UE and a moving communication device in a wireless communication network signaling related to an antenna beam, and to use the antenna beam for subsequent directional communications between the UE and the moving communication device. The signaling is indicative of a beam trajectory along which the antenna beam, which is associated with the moving communication device, is moving. The moving communication device is also moving, along a device trajectory.

A computer program product is also disclosed, and includes a non-transitory computer readable storage medium storing programming. The programming includes instructions to, or to cause the processor to: communicate, between a User Equipment (UE) and a moving communication device in a wireless communication network, signaling indicative of a beam trajectory along which an antenna beam that is associated with the moving communication device is moving, the moving communication device moving along a device trajectory; and use the antenna beam for subsequent directional communications between the UE and the moving communication device.

Other aspects and features of embodiments of the present disclosure will become apparent to those ordinarily skilled in the art upon review of the following description.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION

Figure 1:
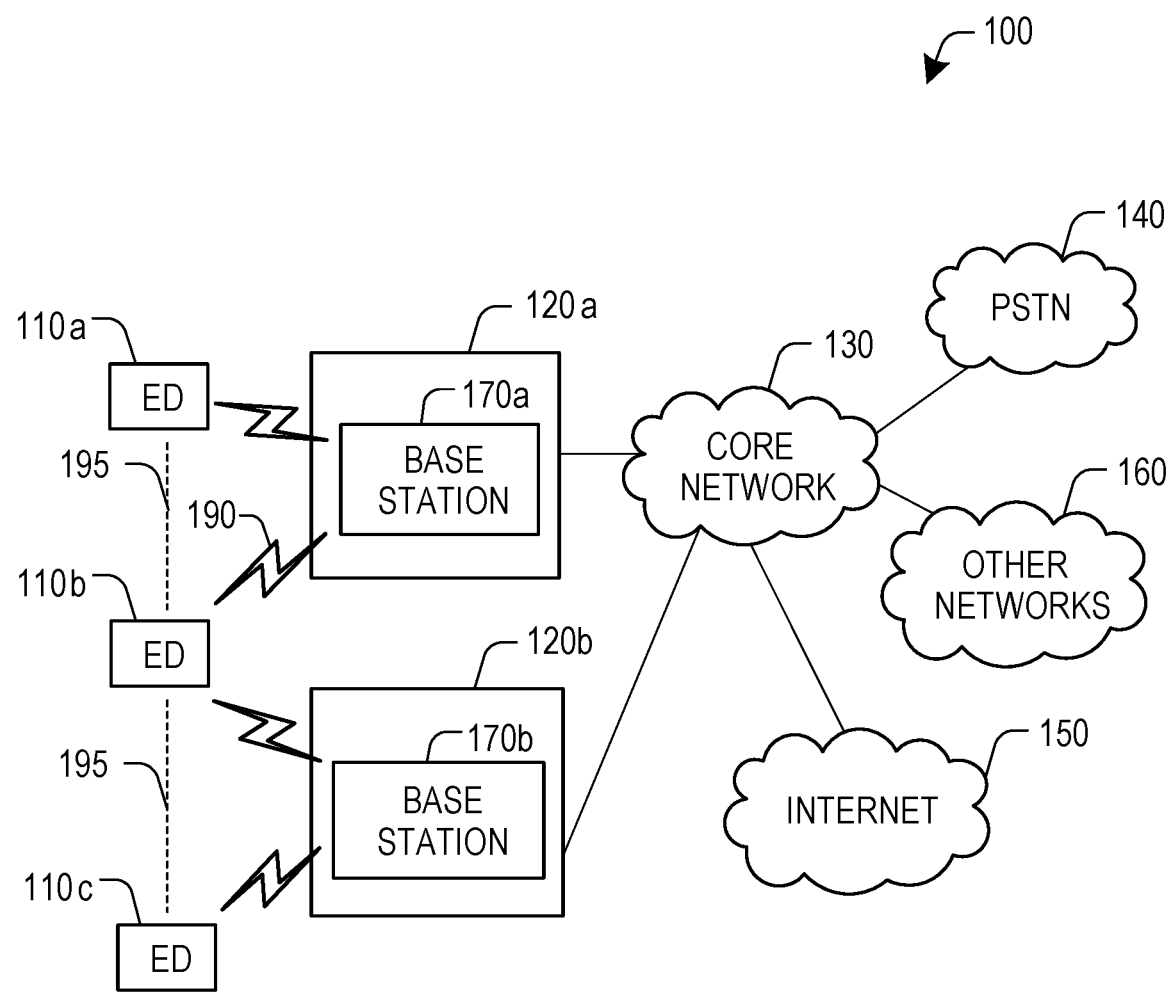
FIG. 1 illustrates an example communication system in which aspects of the present disclosure are implemented in some embodiments.

With reference first to FIG. 1, an example communication system 100 in which aspects of the present disclosure are implemented in some embodiments is shown. In general, the system 100 enables multiple wireless or wired elements to communicate data and/or other content. The purpose of the system 100 may be to provide content (e.g., any one or more of voice, data, video, text, referred to collectively herein as "data") via broadcast, unicast, multicast, user device to user device, etc. The system 100 may operate efficiently by sharing communication resources such as bandwidth.

In this example, the communication system 100 includes electronic devices (EDs) 110a-110c, Radio Access Networks (RANs) 120a-120b, a core network 130, a Public Switched Telephone Network (PSTN) 140, the Internet 150, and other networks 160. While certain numbers of these components or elements are shown in FIG. 1, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices as, or may be referred to as, a User Equipment (UE), Wireless Transmit/Receive Unit (WTRU), mobile station, mobile subscriber unit, cellular telephone, station (STA), Machine Type Communication device (MTC), Personal Digital Assistant (PDA), smartphone, laptop, computer, touchpad, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the Internet 150, and/or the other networks 160. For example, the base stations 170a-170b may be or include one or more of several devices, generally referred to herein as "network devices", such as a Base Transceiver Station (BTS), a Node-B (NodeB), an evolved NodeB (eNodeB), a Home eNodeB, a gNB (next generation NodeB), a Transmission Point (TP), a TRP, a site controller, an Access Point (AP), or a wireless router. Embodiments disclosed herein are targeted toward network deployments in which at least one communication device, which may be a network device, is in motion.

Any ED 110a-110c may be alternatively or jointly configured to interface, access, or communicate with any other base station 170a-170b, the internet 150, the core network 130, the PSTN 140, the other networks 160, or any combination of the preceding. Optionally, the system may include RANs wherein the corresponding base station accesses the core network 130 via the internet 150.

The EDs 110a-110c and base stations 170a-170b are examples of communication equipment that can be configured to implement some or all of the functionality or embodiments described herein. In the embodiment shown in FIG. 1, the base station 170a forms part of the RAN 120a, which may include other base stations, Base Station Controller(s) (BSC), Radio Network Controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b may be configured to operate to transmit and/or receive wireless signals within a particular geographic region or area, sometimes referred to as a coverage area. A cell may be further divided into cell sectors, and a base station 170a-170b may, for example, employ multiple transceivers to provide service to multiple sectors. In some embodiments a base station 170a-170b may be implemented as pico or femto nodes where the radio access technology supports such nodes. In some embodiments, Multiple-Input Multiple-Output (MIMO) technology may be employed having multiple transceivers for each coverage area. The number of RANs 120a-120b shown is exemplary only. Any number of RANs may be contemplated when devising the system 100.

The base stations 170a-170b communicate with one or more of the EDs 110a-110c over one or more air interfaces 190 using wireless communication links e.g. RF, µWave, IR, etc. The air interfaces 190 may utilize any suitable radio access technology. For example, the system 100 may implement one or more channel access methods, such as Code Division Multiple Access (CDMA), Time Division Multiple Access (TDMA), Frequency Division Multiple Access (FDMA), Orthogonal FDMA (OFDMA), or Single-Carrier FDMA (SC-FDMA) in the air interfaces 190.

A base station 170a-170b may implement Universal Mobile Telecommunication System (UMTS) Terrestrial Radio Access (UTRA) to establish an air interface 190 using Wideband CDMA (WCDMA). In doing so, a base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. Understandably, the RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the Internet 150, and the other networks 160). In addition, some or all of the EDs 110a-110c may include functionality for communicating with different wireless networks over different wireless links using different wireless technologies and/or protocols. PSTN 140 may include circuit switched telephone networks for providing Plain Old Telephone Service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such technologies.

It is contemplated that the communication system 100 as illustrated in FIG. 1 may support an NR cell, which also may be referred to as a hyper cell. Each NR cell includes one or more base stations. The base stations of the NR cell may use the same NR cell ID. The NR cell ID is a logical assignment to all physical base stations of the NR cell and may be carried in a broadcast synchronization signal. The NR cell may be dynamically configured. The boundary of the NR cell may be flexible and the system dynamically adds base stations to or removes base stations from the NR cell.

In one embodiment, an NR cell may have one or more base stations within the NR cell transmitting a UE-specific data channel, which serves a UE. The one or more base stations associated with the UE specific data channel are also UE specific and are transparent to the UE. Multiple parallel data channels within a single NR cell may be supported, with each data channel serving a different UE for example.

Direct communications between UEs such as the EDs 110a-110c in FIG. 1 are also possible, and direct communication links 195 between UEs are represented by dashed lines in FIG. 1. UEs may communicate directly with each other over sidelinks, for example.

Additional details regarding the EDs 110 and the base stations 170 are known to those of skill in the art. As such, these details are omitted here for clarity.

Embodiments disclosed herein encompass beam association and tracking in the presence of a moving network device, such as an aTRP, and in the absence of an accurate estimate of UE location/mobility at the network device or an accurate estimate of network device location/mobility at the UE. Beam sweeping can be avoided, to potentially enhance overall network "agility" or enable a network to be more dynamic, without significantly increasing transmitter or receiver complexity.

Embodiments are disclosed herein primarily in the context of beam tracking for communications in the downlink (DL) direction from a network device to a UE. It should be appreciated, however, that features disclosed herein may also or instead be applied to uplink communications or sidelink communications. In addition, although aTRPs are used as an illustrative example of moving network devices, the present disclosure is not in any way limited only to aTRPs, or even to embodiments in which the moving communication device is a network device.

In some embodiments, beams refer to spatial filters. Spatial filters are signal processing techniques applied by devices such as a UE, a T-TRP, or an NT-TRP for the purpose of directional communication, e.g. so that the UE or the T-TRP or NT-TRP can transmit or receive physical layer signals or channels in a certain region of space. In some embodiments, directional communication refers to communication where beamforming is used by devices such as a UE, a T-TRP, or an NT-TRP. In wireless communications, such spatial filtering is used to e.g. focus energy in a certain region of space. One example of spatial filtering in wireless communications is called digital precoding, where different physical layer signals carrying data streams are transmitted using multiple antennas, and the different antennas use different digital phase shifts such that when the physical layer signals are transmitted over the air using the multiple antennas, the signal waves add up constructively in a certain region of space, e.g. where the UE is located. Another example of spatial filtering is analog beamforming where different physical layer signals are transmitted using multiple antennas and the different antennas use different analog phase shifts such that when the physical layer signals are transmitted over the air using the multiple antennas, the signal waves add up constructively in a certain region of space, e.g. where the receiver is located. Another example of spatial filtering is hybrid beamforming, which uses a combination of both digital and analog beamforming to perform signal processing such that signal waves add up constructively in a certain region of space.

In some embodiments, the methods described herein can be applied to communications between one or more of: UEs, base-stations, satellites, sensors, vehicles (e.g. cars, motorcycles, trucks, trains), reconfigurable intelligent surfaces (RIS) (a.k.a. Intelligent reflecting surface (IRS), smart reflect-array, reconfigurable meta-surface, holographic MIMO), and infrastructures.

Some embodiments may involve signaling a beam trajectory for one or more antenna beams associated with a moving communication device such as an aTRP. An antenna beam moves along or over a beam trajectory. For example, a beam trajectory may specify a direction, path, or pattern along which a beam footprint traverses when projected on the ground or another receiver location, and a traversal speed, a traversal time, or another measure of how quickly the antenna beam is moving. Some embodiments employ beams with certain trajectories, which may be pre-defined trajectories.

Standard trajectories, such as a linear trajectory for example, can be described in terms of certain parameters. Examples of such parameters include speed and direction for a linear trajectory. In general, the beam trajectory for a beam may be indicated, described, or defined in terms of certain parameters, which may be signaled to UEs through System Information Block (SIB) signaling or Radio Resource Control (RRC) signaling, for example. Speed, time, direction, path, and pattern as noted above are examples of beam trajectory parameters, and curvature is another example of a beam trajectory parameter that may be signaled in a network. Other parameters may also or instead be used.

A moving communication device may traverse the same trajectory as one or more of its beams, or a different trajectory. Beam trajectory may be de-coupled from a device trajectory or mobility pattern of a moving communication device. For example, an aTRP can maintain a predefined beam trajectory for each beam notwithstanding its own device mobility pattern, which may be, but need not necessarily be, the same as or different from the beam trajectory of the projected beam(s).

A UE, for example, may connect to a moving network device and use an antenna beam based at least in part on beam trajectory. It is expected that a UE is aware of its own mobility, or can at least determine or otherwise obtain information about its own mobility, such as a velocity vector that indicates UE speed and direction of movement. This may enable a UE that is in idle mode, for example, to select a beam and TRP based on a beam trajectory that best aligns with the mobility pattern of the UE. A UE may also or instead select a beam and TRP based on a beam trajectory that is expected to result in maximum coverage time duration for the UE. These are examples of mobility-aware criteria based upon which an antenna beam may be selected in some embodiments.

Using a mobility-aware criterion for beam and moving communication device selection, UEs at similar locations and with similar mobility patterns are expected to connect to the same communication device using the same beam. In this way, UEs may be classified into a number of beamforming groups, where UEs in each group have a mobility pattern similar to a beam trajectory of a particular beam. UE location and mobility pattern are examples of parameters that may be used as criteria for UE association and classification into beamforming groups. Beamforming groups may be used to manage or control beamforming, for example by steering a respective dedicated beam for each group toward the UE(s) within the same group.

Mobility awareness, in the context of downlink direction or initial access based on downlink reference signals for example, may include awareness of beam trajectory, network device trajectory, or both, by the UE. In this example, the UE may also have mobility awareness of its own mobility, such as its own speed and direction of travel. A mobility-aware criterion may take any or all of these and/or other mobility awareness parameters or characteristics into account.

Other criteria may also be used in selecting a moving communication device and beam. A UE may measure RSRP, for example, and use beam trajectory to select between communication devices or beams that have an acceptable RSRP.

Beam trajectory may also or instead be used by a UE to monitor beam alignment. For example, a UE may detect a beam misalignment in advance, before a beam failure occurs, by exploiting knowledge of beam trajectory.

A UE may transmit beam tracking feedback to a moving communication device, to assist in aligning or refining one or more steered beams for example. Based on received feedback, a moving communication device may adjust such parameters as transmit beam width and/or direction. For example, a UE may transmit beam tracking feedback to a moving communication device to signal to the communication device to shift a transmit beam towards a certain direction. As discussed in further detail elsewhere herein, feedback signaling may indicate or be translated into a certain change in Angle of Departure (AoD) at the transmitter side, which would be at a moving network device in the case of downlink communications, for example.

Feedback may also or instead indicate one or more other adjustments that are to be made. For example, feedback may indicate the need to double or otherwise adjust beam width, or may indicate the need to switch the UE to another beam such as an existing adjacent beam.

Feedback need not necessarily be sent only in response to detection of misalignment. A UE may also or instead send feedback responsive to confirming that beam alignment is sufficient for current communication needs or otherwise satisfies one or more criteria. Feedback in the event of UE detection of perfect alignment or at least a threshold degree of alignment, over a certain time interval for example, may signal the moving communication device to split or reduce beam width and thereby transition to a narrower beam for communications with the UE.

Beamforming groups may be refined, and/or the respective associated dedicated beams that serve those groups can be further aligned or refined, based on feedback signaling. Such signaling may be transmitted by UEs in RRC connected mode, for example, or by UEs in other modes such as inactive mode or idle mode. A moving communication device may classify or re-classify UEs into a number of beamforming groups based on received feedback. For example, a moving communication device may classify or re-classify UEs into a number of finer beamforming groups. When one or more UEs currently in a beamforming group are no longer sufficiently aligned with the dedicated beam that is serving that beamforming group, the moving communication device may determine that the UEs are to be further partitioned, and then serve each partition with a respective dedicated beam.

UE grouping may be particularly useful when different groups of UEs have different velocity vectors. Based on UE feedback, a moving communication device can update its estimates of UE velocity vectors. The communication device may then partition or re-partition the UEs into new or refined beamforming groups of UEs that have similar velocity vectors or mobility patterns.

In some embodiments, UEs with low transmission rates, relative to one or more thresholds or relative to other UEs for example, may remain in a current or coarse beamforming group or keep using current or initial coarse beamforming. It is possible to restrict beamforming group reclassification, and/or other features such as beam tracking and/or transmitting UE feedback, to only UEs with demanding applications, UEs with a certain transmit buffer status, or UEs that frequently transmit communication traffic, for example.

Beam alignment monitoring need not be limited to enabling only reactionary operations when misalignment is detected. As an example, a UE may adaptively adjust its receive beam direction based on monitoring beam alignment by predicting an Angle of Arrival (AoA) based on a device trajectory along which or over which a moving communication device such as a current serving aTRP is moving, and its own UE trajectory or mobility pattern, without employing a beam sweeping procedure. In this example, the UE uses its knowledge of the device trajectory and its own mobility pattern to predict AoA over an upcoming time interval and proactively adjust receive beam direction. A UE may also or instead take other action based on beam trajectory and/or mobility pattern predictions, to switch between different antenna panels for example.

In general, embodiments may involve communicating signaling indicative of beam trajectory and managing connectivity based on the beam trajectory. Connectivity management may involve such features as any one or more of: establishing a connection, monitoring beam alignment, communicating signaling indicative of feedback, and adjusting one or more parameters of one or more beams, for example. Moving communication device trajectory may also or instead be signaled and used in some embodiments.

These and other features are discussed in further detail at least below.

Figure 2:
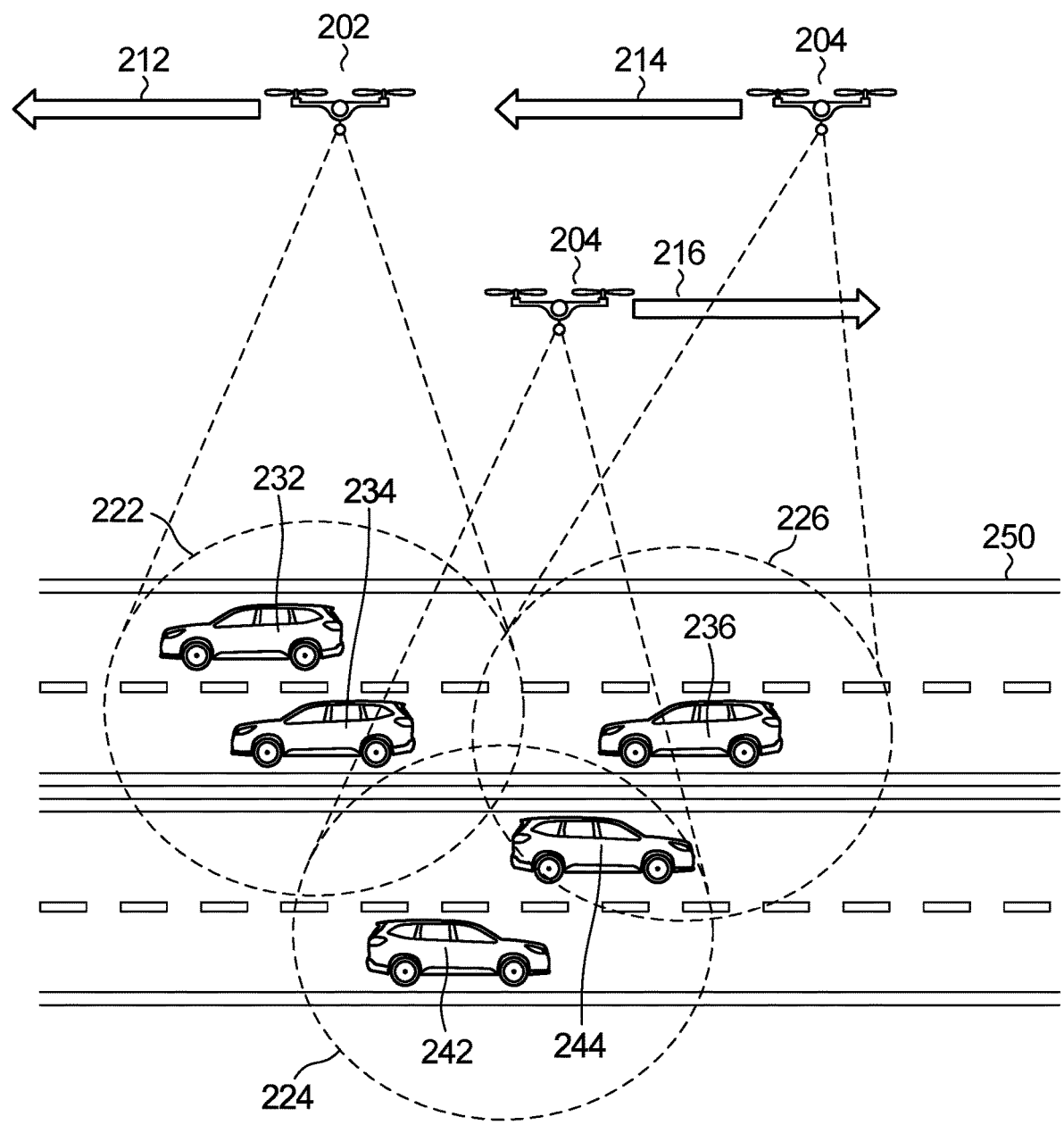
FIG. 2 is a block diagram illustrating an example communication system with multiple aTRPs and beams following linear trajectories.

FIG. 2 is a block diagram illustrating an example communication system with multiple aTRPs 202, 204, 206 and beams following linear trajectories. Projections of respective beams associated with the aTRPs 202, 204, 206 are shown at 222, 224, 226. Although only one beam per aTRP is shown in FIG. 2, in general one or more beams may be associated with an aTRP.

In this example, the UEs 232, 234, 236, 242, 244 are vehicles or are devices in the vehicles, which are travelling in opposite directions on the roadway 250.

In FIG. 2, there are predefined device trajectories for the aTRPs 202, 204, 206, as well as beam trajectories for their projected beams 222, 224, 226. The aTRP device trajectories are linear, from right to left for the aTRPs 202, 204 as shown at 212, 214, and from left to right for the aTRP 206 as shown at 216. The aTRP device trajectory for each aTRP 202, 204, 206 may be pre-configured, so that it can potentially be signaled to UEs on a long-term basis. For example, average velocity and flying direction of an aTRP may be specified for several minutes or hours. Even when a long term flight path is not known, a base station or other network device may specify a velocity vector such as an average velocity vector of an aTRP for several minutes.

In order to avoid congestion in the drawing, beam trajectories for the beam projections 222, 224, 226 are not separately shown in FIG. 2. Solely for illustrative purposes and for ease of reference, a scenario in which beam trajectories are the same as the aTRP device trajectories 212, 214, 216 in FIG. 2 is considered.

According to the present disclosure, the device trajectory of an aTRP is decoupled from the trajectory of its projected beam(s). Therefore, an aTRP can maintain a predefined beam trajectory for each beam, notwithstanding its own device trajectory or mobility pattern. It should be noted that an aTRP may have some sporadic changes or movements around its long-term device trajectory, such as changes in instantaneous speed because of turbulence or temporary changes in direction to avoid a collision. Even when the beam trajectory defined for the projected beam(s) is the same as the device trajectory for an aTRP, an aTRP should maintain a certain beam "footprint" conforming to the predefined beam trajectory for the projected beam, notwithstanding the sporadic changes in the movement of the aTRP.

Another interesting use case for defining a beam trajectory for each beam separately from aTRP device trajectory is to enable the aTRP to track different UEs or groups of UEs. Although the example in FIG. 2 illustrates one beam per aTRP 202, 204, 206, the same aTRP may generate more than one beam, with each beam possibly following a different beam trajectory. For example, in the illustrated roadway scenario, one aTRP may generate two beam trajectories traversing in the same direction but with different velocities. For example, one beam might be configured according to the average velocity of a UE at 234 in the high speed lane, while another beam might be configured to follow UEs at 234, 236 in the low speed lane.

In practice, a trajectory, such as a beam trajectory or a device trajectory, can be defined according to any of a number of standard trajectory patterns, such as fixed footprint, linear, circular, or elliptic trajectories. A trajectory pattern can be signaled, to signal a beam trajectory or a device trajectory to a receiver or to signal a device trajectory to a moving communication device such as an aTRP to control its movement for example, in any of various ways. For example, 2 bits may be used to distinguish between the above four example trajectory patterns. For a trajectory pattern, a trajectory may be indicated, defined, or specified in signaling using characterizing parameters for each trajectory pattern. Trajectory pattern may be specified as part of a trajectory, or separately.

Examples of trajectory patterns and characterizing parameters are provided in Table 1 below:

TABLE 1

Example trajectory patterns and characterizing parameters

| Trajectory pattern | Characterizing parameters (those with * are optional) | | | |
|---|---|---|---|---|
| Fixed | Center point (16 bits) | Radius (8 bits) | | |
| Linear | Speed (8 bits) | Direction (4 bits) | * Reference Point (16 bits) | * Coverage Radius (8 bits) |
| Circular | Center point (16 bits) | Radius (8 bits) | Linear Speed (8 bits) | |
| Elliptic | Focal points (32 bits) | Focal Distance (8 bits) | Linear Speed (8 bits) | |

The trajectory patterns, characterizing parameters, and bit lengths in Table 1 are for illustrative purposes only. Any or all of these may be different in other embodiments.

A fixed footprint can be specified by the location of its center point and the coverage radius, for example. A geographical location may be signaled in an embodiment using 3 bytes for longitude and 3 bytes for latitude to provide precision of the Global Positioning System. In practice, however, an aTRP and UEs are located at relatively close positions. In such a scenario, one or more of the Most Significant Bits (MSBs) might not carry information that is relevant, and signaling several Least Significant Bits (LSBs), such as 8 or 12 LSBs, may be sufficient to indicate trajectories. Therefore, using 2 or 3 bytes in total may suffice to signal a geographical coordinate in most applications. A location that is signaled may be an absolute location or a relative location. For example, a location may be signaled in terms of absolute geographical coordinates, or in terms of relative location with respect to one or more reference/anchor points. A single byte may suffice for radius, depending on desired unit of measure and granularity for example.

A linear trajectory can be described by a velocity vector, which specifies speed and direction of movement. The direction can be signaled using a limited number of quantized geographical directions. A receiver may infer, calculate, or otherwise obtain the exact direction by exploiting other available information. For example, in the roadway scenario shown in FIG. 2, a single bit may suffice to indicate one of the two opposite directions of travel on the roadway 250. 4 bits are sufficient to specify direction with a granularity of 22.5°. A single byte (8 bits) may suffice to specify velocity, with a granularity of 1 km/h, for speeds of up to 256 km/h. Different units of measure or granularities may be used for speed in other embodiments. For a linear trajectory, the location of a reference starting point, such as the location of the beam center at the time a signal is transmitted, may optionally be signaled as shown in Table 1. Coverage radius at each point is also shown as another example of an optional characterizing parameter in Table 1.

A circular trajectory can be indicated, described, defined, or specified by signaling the location of the center point, the radius, and the linear speed. Instead of the linear speed, a time period to complete a single round may be signaled to provide an indication of how fast a moving communication device is moving.

Similarly, an elliptic trajectory can be indicated, described, defined, or specified by signaling the location of two focal points, focal distance (the summation of the distance of every point from the two focal points), and the linear speed or time period to complete one traversal of the trajectory.

The comments provided above regarding center point and radius bit lengths for a fixed footprint trajectory also apply to the center point and radius for a circular trajectory and to the focal points and focal length for an elliptic trajectory. Similarly, the comments provided above regarding bit lengths to specify speed for a linear trajectory also apply to linear speed for a circular trajectory or an elliptic trajectory. A time period, including a time period to traverse a circular trajectory or an elliptic trajectory and other times referenced herein, may be indicated in any of various time units, with any preferred granularity.

Decoupling the device trajectory of a moving communication device from the beam trajectory of the projected beam(s) may enable the moving communication device to maintain, and signal to UEs, a predefined beam trajectory for each beam notwithstanding the mobility pattern of the moving communication device or sporadic changes in its movement. In some embodiments, it is the beam trajectory that is important to UEs, rather than the device trajectory of a moving communication device, to detect beam alignment for example.

Figure 3:
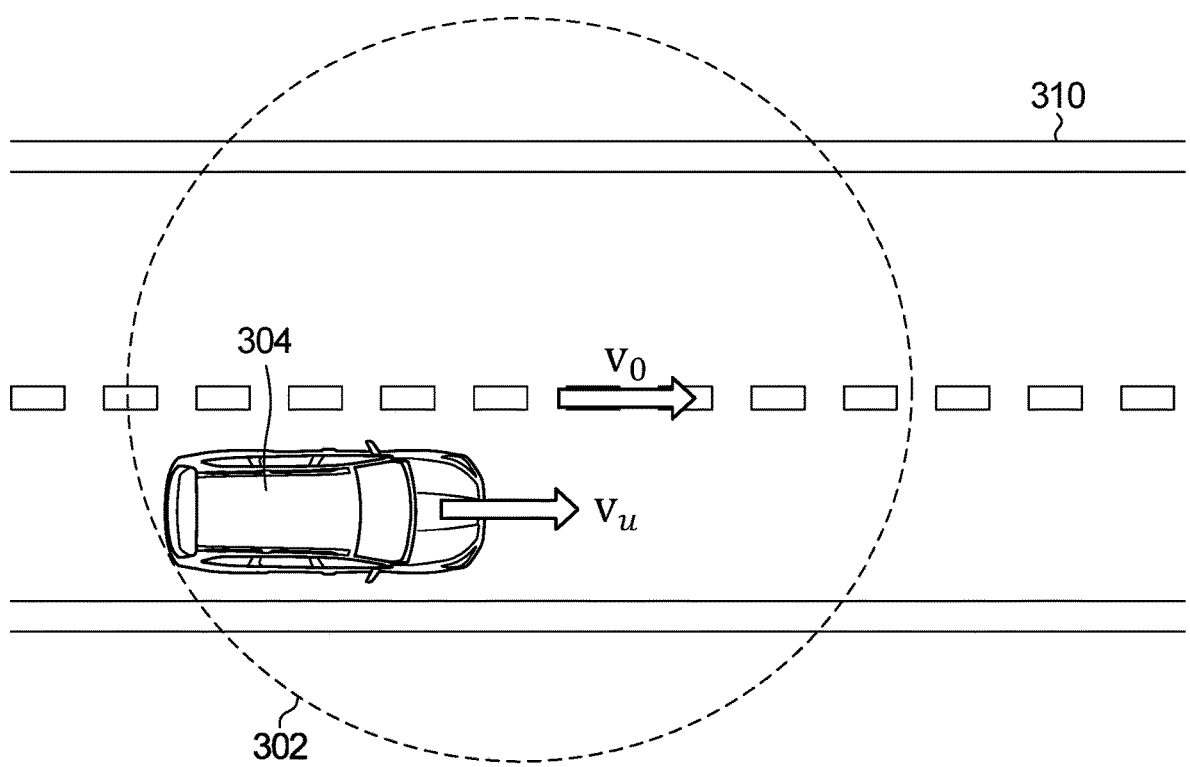
FIG. 3 is a block diagram illustrating a beam footprint and a UE with linear trajectories.

According to an aspect of the present disclosure, a UE may detect beam alignment, or beam misalignment, by exploiting the knowledge of the beam trajectory. As an example, consider again a linear trajectory. FIG. 3 is a block diagram illustrating a beam footprint and a UE with linear trajectories. The beam footprint is shown at 302, and the UE is the vehicle 304 or in the vehicle, which is traveling along the roadway 310.

In an embodiment, based on the beam trajectory, a misalignment is detected when the UE deviates from the beam trajectory. As in FIG. 3, let $\vec{v}_0$ and $\vec{v}_u$, respectively, denote a velocity vector of the projected beam 302 and the UE at 304. For the purpose of this example, it is assumed that the UE is aware of, or at least is able to determine or otherwise obtain, its velocity vector. A misalignment may be detected, for example, when a difference between the UE velocity vector and the beam trajectory has a magnitude that is greater than a pre-defined threshold $\eta_0$:

$$\text{avg}(|\vec{v}_u - \vec{v}_0|) > \eta_0$$

This may occur, for example, when the UE changes direction.

To filter out instantaneous changes or measurement errors in UE velocity, an average may be taken over a few measurements. This criterion may capture a scenario in which a UE changes direction, such as when the vehicle 304 takes an exit from the roadway 310 for example.

The UE may also or instead detect a misalignment based on displacement or offset between UE location and beam center. This situation is captured by either of the following conditions, for example:

$$|\vec{v}_u - \vec{v}_0| \times (t_2 - t_1) > \eta_1$$

or $$\int_{t_1}^{t_2} |\vec{v}_u(t) - \vec{v}_0(t)| dt > \eta_1$$

where $\eta_1$ is a threshold.

That is, in this example a misalignment is detected when an offset is developed in the relative position of the UE with respect to the beam center over an observation time interval $t_1$ to $t_2$.

The UE may check received signal power to determine whether the offset in the user location has a destructive effect on the received signal, by applying one of the following criteria:

$$|\vec{v}_u - \vec{v}_0| \times (t_2 - t_1) > \eta_1$$

or $$\int_{t_1}^{t_2} |\vec{v}_u(t) - \vec{v}_0(t)| dt > \eta_1$$

in combination with:

$$\text{RSRP}(t_1) - \text{RSRP}(t_2) > \eta_2$$

where $\eta_1$ and $\eta_2$ are thresholds.

These are examples intended to show how the knowledge of beam trajectory can potentially be used to detect beam misalignment on the UE side in some embodiments. Other information, such as the location of the beam center, signaled at some time instant $t_1$ for example, can also or instead be used, to provide additional measures to detect a misalignment at time $t_2$. The following condition is an example:

$$x(t_2) - x(t_1) > \eta_x$$

where x(t) is the UE relative position with respect to the beam center at time t, and $\eta_x$ is a threshold.

In practice, a variant and/or combination of these conditions or others may be used to detect a beam alignment or misalignment.

Based on beam trajectory, beam misalignment may be detected before a beam failure occurs, and feedback may be sent to a moving communication device, for example to help align a steered beam. In this way, a beam failure, as well as the associated latency and signaling to recover from a beam failure, may be avoided.

In some embodiments, knowledge of mobility patterns is used to predict one or more parameters, such as AoA or coverage duration. AoA, for example, may be determined based on device trajectory of the moving communication device and UE trajectory in some embodiments. The device trajectory of the moving communication device can possibly be estimated, inferred, determined, or extracted from physical signal characteristics, such as Doppler shift, round trip time, etc. A moving communication device may instead signal its device trajectory to the UE. In some embodiments, device trajectory and beam trajectory are the same.

Figure 4:
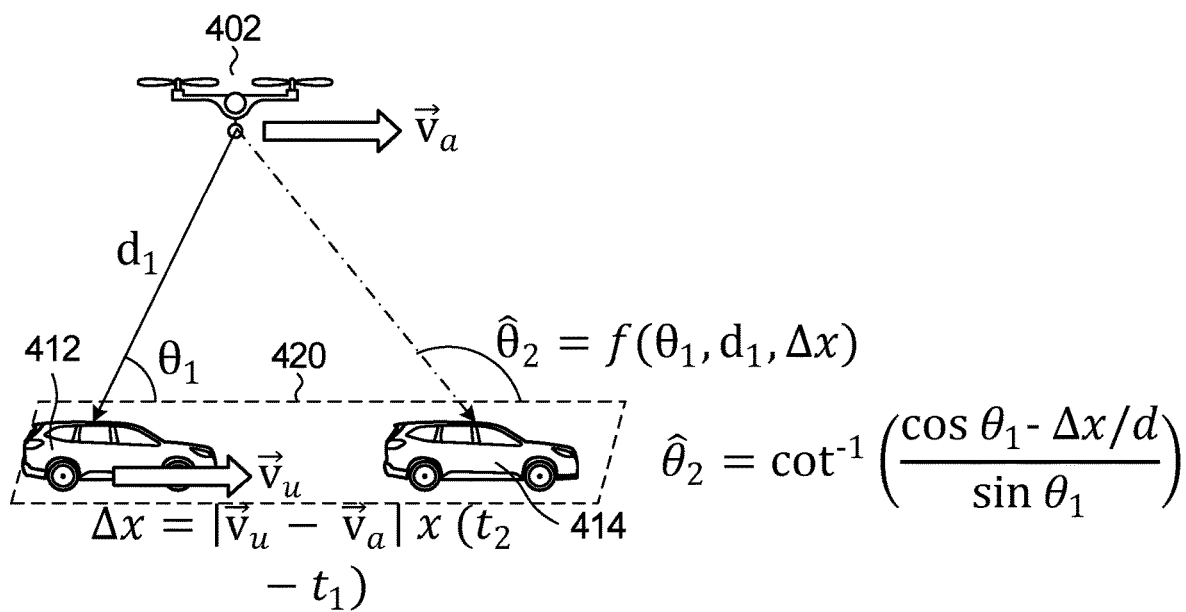
FIG. 4 is a block diagram illustrating changes in AoA due to movement of a UE relative to an aTRP.

Changes in AoA at a UE when traversing from one location (at time $t_1$) to another (at time $t_2$) may be predicted based on device trajectory of a moving communication device. This is illustrated in FIG. 4, which is a block diagram illustrating changes in AoA due to movement of a UE relative to an aTRP 402. In FIG. 4, the UE is, or is in, a vehicle traveling along a roadway 420, and locations of the vehicle at times $t_1$ and $t_2$ are shown at 412, 414, respectively.

According to an embodiment, the UE can first find a relative change in position of the UE with respect to the aTRP 402, denoted $\Delta x$, as:

$$\Delta x = |\vec{v}_u - \vec{v}_a| \times (t_2 - t_1)$$

for example, where $\vec{v}_u$ and $\vec{v}_a$ are velocity vectors of the UE and the aTRP 402, respectively, as shown in FIG. 4. Then the AoA at time $t_2$ can be predicted, for example as:

$$\hat{\theta}_2 = \cot^{-1}\left(\frac{\cos\theta_1 - \Delta x/d_1}{\sin\theta_1}\right)$$

where $\hat{\theta}_2$ is the predicted AoA.

AoA may be useful, for example, for beam tracking. A predicted AoA can be used to adjust the receive beam direction in some embodiments. This may reduce overhead for beam tracking on the UE side, which can be important for UEs with sporadic communication traffic patterns, for example.

Figure 5:
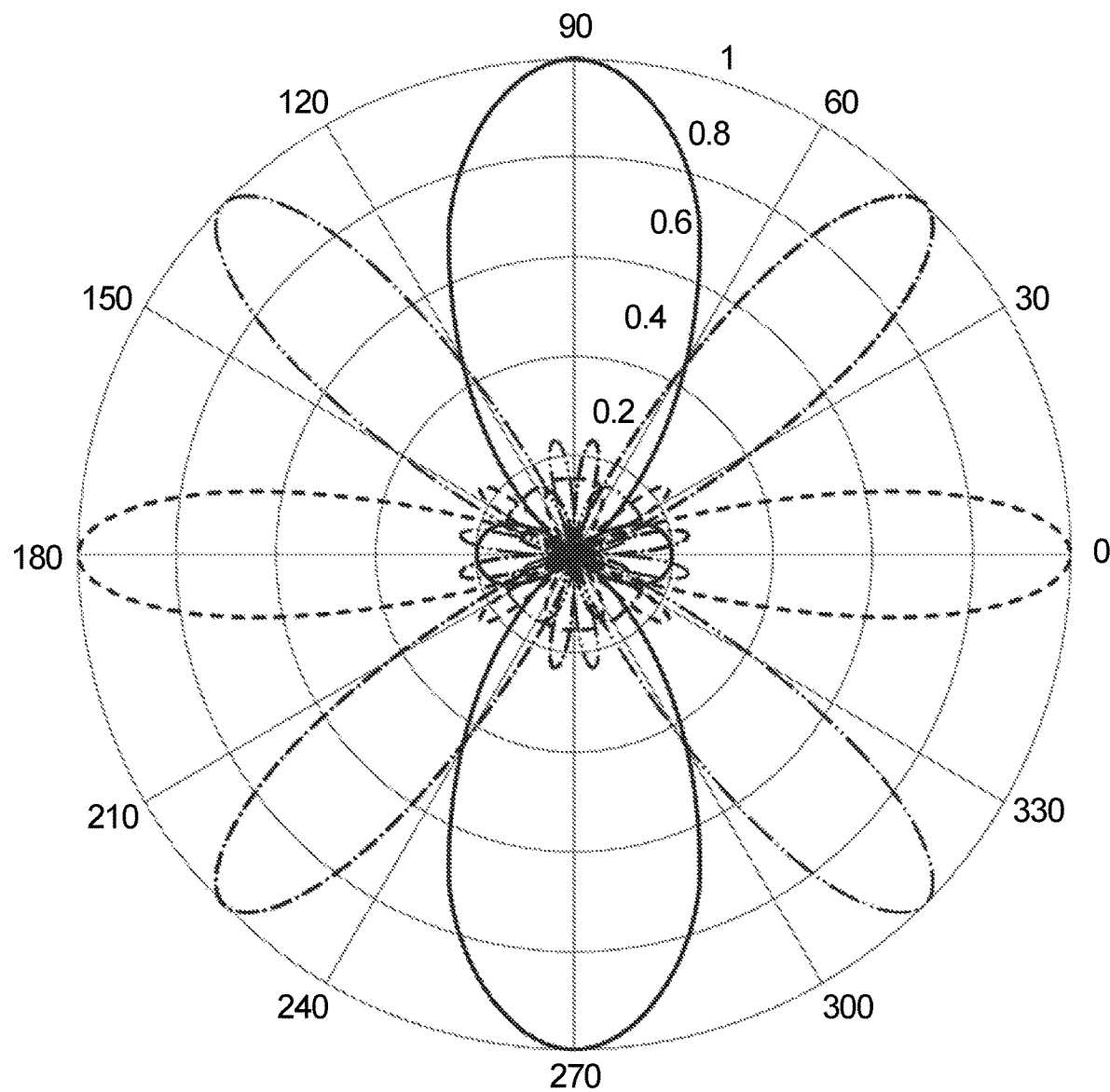
FIG. 5 is an example of a beamforming pattern for an antenna array.

Moreover, depending on implementation, UEs may make adjustments based on AoA. For example, depending on the type of the antenna array and the codebook employed, one or more of beam width and array gain may vary with AoA. This is illustrated in FIG. 5, which is an example of a beamforming pattern for an antenna array. When the receive beam width varies in different directions, a threshold to detect a misalignment may be adjusted based on the AoA. The UE may also or instead send beam tracking feedback to a moving communication device such as an aTRP to adjust the transmit beam width to increase or decrease beam width in each direction, so as to maintain a certain gain for the transmit-receive beam pair in each direction. A UE might be equipped with more than one antenna panel, each possibly with a different beamforming pattern in different directions. In this case, the UE may switch between different antenna panels, depending on predicted AoA.

Another possible application of prediction of changes in AoA is to assess the time interval over which a beam or a set of beams can be used, jointly in the case of a set of multiple beams, by a UE for either or both of transmission and reception.

In an embodiment, a UE could detect the signal of a beam while the AoA is within a certain range, and based on a rate of changes in the AoA for example, the UE can estimate a time duration $T_1$ during which the AoA is expected to be within an acceptable range for a certain beam. This time duration is an example of an expected duration of coverage.

In the case of misalignment between UE velocity and beam trajectory, corresponding to $|v_u-v_0|>0$ in FIG. 3 for example, the UE may exit beam coverage after a certain time interval, $T_2$, if there is no compensation or adjustment for the misalignment. If $D_u$ denotes the distance between the UE and an edge of the beam projection on the ground, then with reference to the notation in FIG. 3, $T_2=D_u/|v_u-v_0|$, when the misalignment is not compensated. Beam coverage duration is then given by $T=\min\{T_1, T_2\}$. If misalignment is detected and compensated, then $T_2$ increases, to infinity if compensation is effective, and beam coverage is limited by $T_1$. The expected duration of coverage can be included in measurement reports or feedback transmitted by the UE to the moving communication device.

UE prediction of AoA may enable a UE to adjust receive beam direction, without employing a beam sweeping procedure. A UE may also or instead use predicted AoA to make timely decisions to switch between different antenna panels. In some embodiments, coverage duration may also or instead be predicted, and possibly included in measurement reports or feedback. Coverage duration prediction and reporting may enable a UE to make measurements at a lower rate, which may in turn reduce signaling and overhead associated with beam tracking.

Linear trajectories are used herein for illustrative purposes. Other trajectories are also possible. For example, in some embodiments a moving communication device follows a circular device trajectory pattern. For the sake of power economy in the case of an aTRP for example, it may be preferred that an aTRP keeps flying with at least a minimum velocity, rather than hovering at a fixed location. A circular trajectory pattern is one possible solution to enable an aTRP to keep flying with a constant velocity or at least a minimum velocity while covering a fixed footprint. A circular trajectory can be specified, for example, by signaling the center point, trajectory period or velocity, and radius or curvature to a UE.

Figure 6:
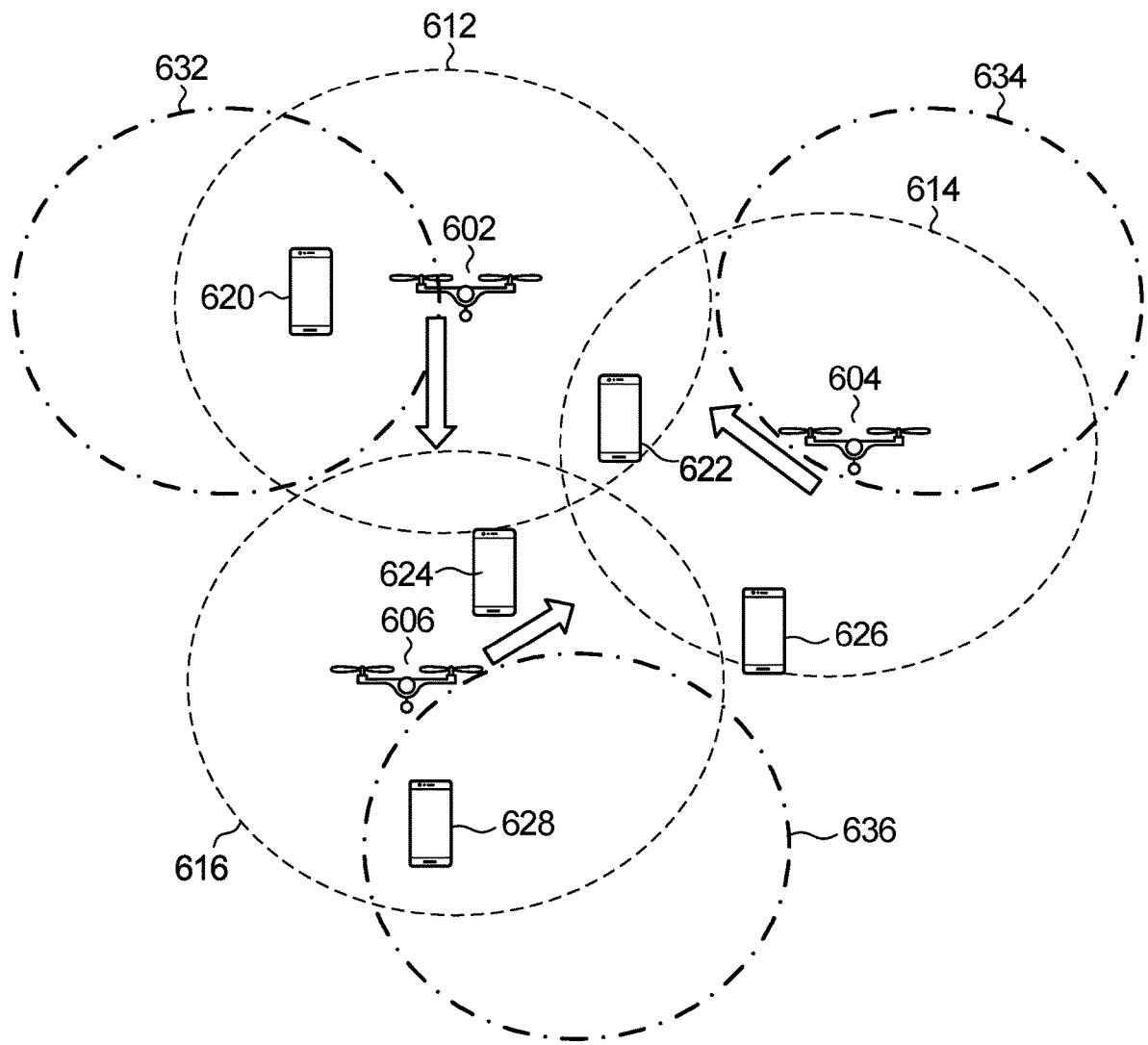
FIG. 6 is a block diagram illustrating aTRPs with circular trajectories.

FIG. 6 is a block diagram illustrating aTRPs with circular device trajectories. In FIG. 6, aTRPs are shown at 602, 604, 606, a respective beam projection associated with each aTRP is shown at 612, 614, 616, UEs are shown at 620, 622, 624, 626, 628, and a respective circular device trajectory pattern for each aTRP is shown at 632, 634, 636.

As an example, let $T_0$ denote a time period for an aTRP 602, 604, 606 to complete one round or traversal over its trajectory 632, 634, 636. A circular device trajectory for an aTRP results in periodic observations from the perspective of a stationary UE. For example, with circular aTRP device trajectories, the RSRP for each beam, the best serving beam, and the AoA of the received signal from each aTRP will be periodically changing from the viewpoint of each UE 620, 622, 624, 626, 628.

Figure 7:
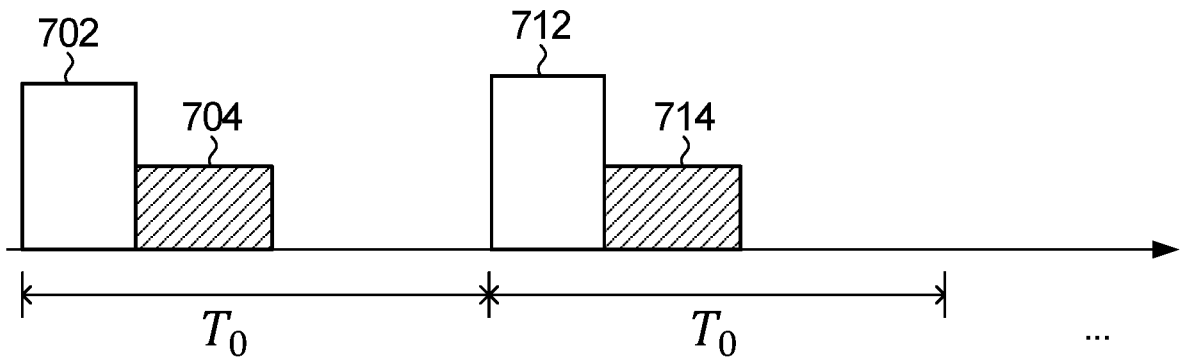
FIG. 7 is a plot illustrating periodic observations of received signal power.

FIG. 7 is a plot illustrating periodic observations of received signal power. Considering a scenario in which the aTRPs 602, 604 in FIG. 6 complete one traversal of their respective device trajectories 632, 634 within the time period $T_0$, the UE 622 may observe the beam associated with the aTRP 602 as a strongest beam at 702, 712 in each period $T_0$, and may observe the beam associated with the aTRP 604 as a strongest beam at 704, 714 in each period $T_0$.

It may be preferable to signal periodicity of a circular device trajectory to a UE to enable the UE to make measurements and average them over periodic time intervals, for example. Averaging time intervals may align with periodicity time intervals or include periodicity time intervals so that the UE obtains an accurate indication of average received signal power. A UE may also or instead use a periodic pattern to switch between different antenna panels, beams, or aTRPs periodically.

Other closed curves or shapes of aTRP device trajectories, such as elliptic trajectories for example, may also result in periodic observations from the perspective of a stationary UE. Describing such trajectories, however, may involve signaling more parameters, such as the positions of focal points in Table 1 above, to UEs.

A moving UE might not experience fully periodic observations. However, the knowledge of aTRP device trajectory may still help a moving UE to predict channel quality and received signal power of one or more beams over an upcoming time interval.

Signaling the periodic device trajectories of aTRPs to UEs may enable the UEs to predict the RSRP of different beams in different directions, adjust their receive beam direction, and/or switch between different antenna panels, for example, by in effect tracking or following the aTRPs in their device trajectories. UEs may also or instead exploit periodic device trajectory information to avoid at least some measurements that might otherwise be made, because periodicity may allow the best receive beam and direction to be determined or otherwise obtained by the UEs in advance.

When a misalignment is detected by a UE, or depending on changes in AoA, for example, a UE may send beam tracking feedback to a moving communication device such as an aTRP. Such feedback may help in aligning or refining a steered beam, for example.

In case of misalignment, a UE may signal a moving communication device such as an aTRP to, for example, (a) shift a steered beam towards a certain direction, (b) switch the UE to an adjacent beam or aTRP, or (c) adjust beam width, such as by doubling, otherwise increasing, or splitting the beam width.

Figure 8:
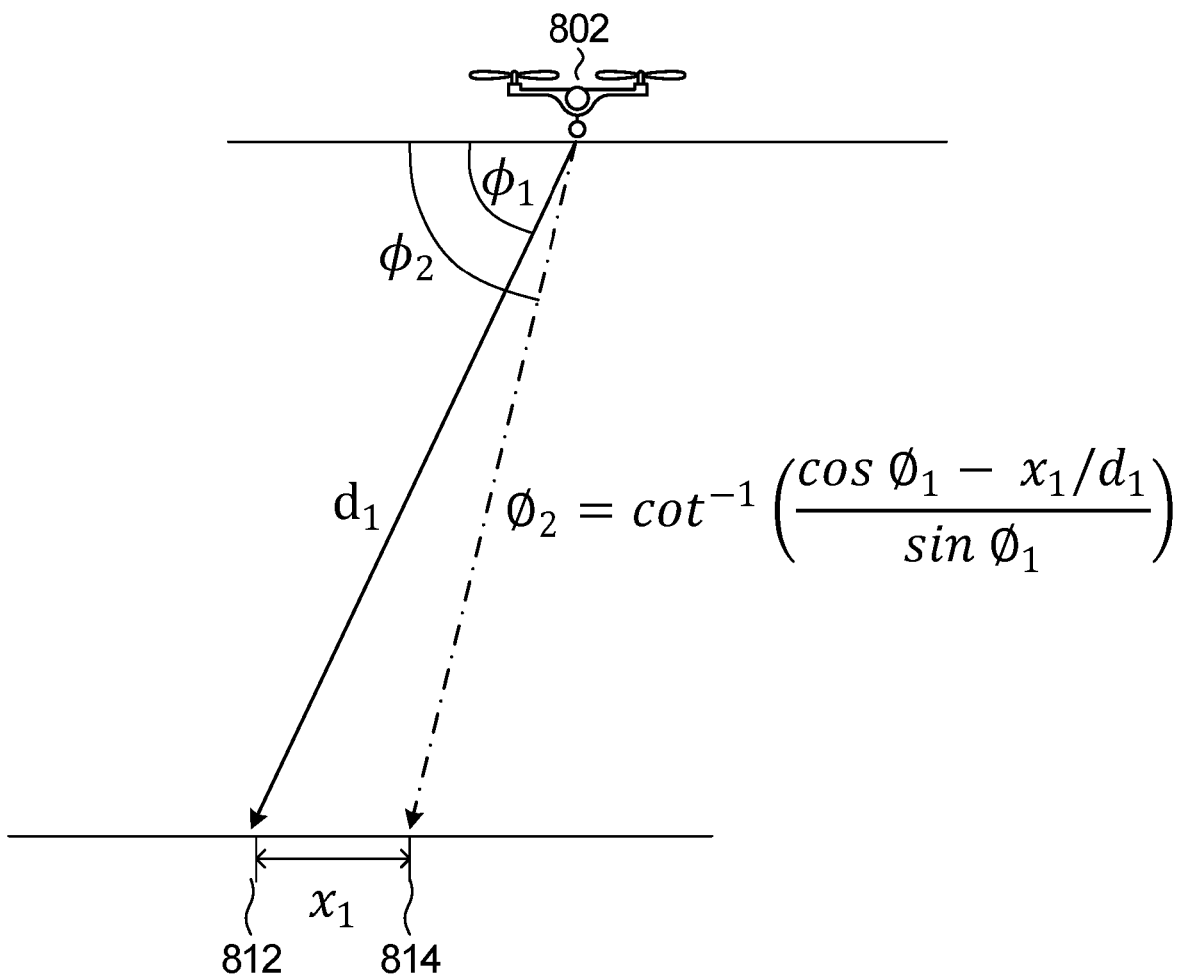
FIG. 8 is a block diagram illustrating changes in AoD due to movement of a UE relative to an aTRP.

Consider an example in which a request signal to shift a steered beam towards a certain direction is triggered by or responsive to a UE detecting a displacement between the relative user-position with respect to the beam center. This request signal can be translated into a certain shift in the AoD at the transmitter side, as depicted by FIG. 8, which is a block diagram illustrating changes in AoD due to movement of a UE relative to an aTRP 802. UE locations are illustrated at 812, 814, and for the purpose of this example 812 is also the beam center toward which the beam is currently pointing. 814 indicates a new beam center location toward which the beam should be steered, where the UE is now located in this example. Such a shift in beam center is translated into a certain change in the AoD at the aTRP 802 in some embodiments.

Changes in relative position between a UE and a beam center as shown in FIG. 8 may be due to one or more of: movement of the UE, movement of the aTRP, and movement of the beam.

In FIG. 8, suppose that the aTRP 802 receives multiple misalignment detection signals, or other signaling such as multiple beam direction shifting request signals, from the same UE with respect to the same beam. This may indicate an offset between the beam trajectory and the UE velocity. The aTRP 802 may use the inter-arrival time between the two subsequent request signals to adjust its estimate of UE velocity. Based on this information, the aTRP 802 may switch the UE to another existing beam, or to a new beam with a customized trajectory that better matches the UE velocity for example.

A request to switch a UE to an adjacent beam or to a different moving communication device can be made when the UE changes direction, or when an adjacent beam or moving communication device exceeds a current beam or moving communication device in terms of received signal power or quality, for example. The specific event to trigger a beam or moving communication device switch may be indicated in feedback as a way to show the urgency for beam switching. For example, a change in movement direction might be considered an urgent event.

A UE may also or instead instruct a moving communication device such as an aTRP to adjust beam width. In the case of perfect alignment, or some other measure of sufficient alignment, over a certain time interval the UE may signal the moving communication device to split beam width for example, to increase the achievable bit-rate or decrease the required transmit power for communications between the UE and the moving communication device. In the case of misalignment detected by the UE, the UE can signal the moving communication device to increase beam width. This can be particularly useful to maintain the connection when the UE has a sporadic communication traffic pattern, for example. A request for transmit beam width adjustments can also or instead be made to address variable receive beam width or variable beamforming resolutions over different AoAs.

Based on received feedback, a moving communication device such as an aTRP may adjust beam width and/or direction, as described elsewhere herein. A moving communication device may also or instead adjust its estimate of UE mobility pattern and/or location, and then classify or re-classify UEs into beamforming groups based on the adjusted estimates. For example, when some UEs are not aligned, a moving communication device may decide to partition or re-partition the UEs, so that UEs of each division with very close mobility patterns are served with a respective dedicated beam. A moving communication device may also or instead switch one or more UEs to an existing beam such as an adjacent beam, or a new beam, that better matches the UE mobility pattern(s). Increasing beam width and shifting beam direction are other possible options for handling a scenario in which one or more UEs in a group are not aligned with the dedicated beam for the group.

Providing a moving communication device with feedback may enhance beam tracking in the absence of an accurate estimate of UE position or mobility at the moving communication device, while maintaining a low complexity at both a UE and the moving communication device. A UE may be enabled to detect misalignments in advance and then signal a moving communication device to indicate how to adjust transmit beam parameters such as width and/or direction. In this way, a moving communication device may adjust AoD and/or beam width, and may also or instead adjust estimates of such parameters as UE location, UE mobility, or both.

The illustrative examples above relate primarily to downlink communications, from a network device such as an aTRP to a UE. Features disclosed herein may also or instead be applied for beam acquisition and/or tracking in the uplink direction. For example, in an uplink embodiment a UE or an antenna beam radiated by the UE is to follow the device trajectory of a moving communication device such as aTRP. The UE may have an initial estimate of the device trajectory of the moving communication device, and may signal to the moving communication device the beam trajectory of the beam that the UE steering to follow the moving communication device. The moving communication device may use the beam trajectory of the steered beam to detect whether there is a misalignment between the beam trajectory of the steered beam and the mobility pattern of the moving communication device. The moving communication device may provide the UE with beam tracking feedback to help the UE align the beam direction and/or velocity with the moving communication device, and/or to adjust beam width, for example.

Other actions or features, such as those referenced herein for a network device and a UE for downlink embodiments, may also be implemented at a UE or a network device, respectively, for uplink embodiments, or at multiple UEs for sidelink embodiments.

Mixed embodiments are also possible. For example, if there is channel reciprocity in the uplink and downlink directions, or more generally when there is beam correspondence in the uplink and downlink directions, beam management in one direction may help with communications in the other direction. An antenna beam that was acquired, tracked, or otherwise managed based on signaling in one direction, for example, may be used for communications in the other direction. Such reciprocity or beam correspondence might not always exist, but may be exploited in some embodiments.

In addition to beam trajectory, or instead of beam trajectory in some embodiments, a UE trajectory such as a long-term UE trajectory may also be signaled to a network device or to another UE. Signaling of UE trajectory may help the network device or other UE to estimate the AoA so as to adjust receive beam direction. It may also be helpful in switching a UE between different network devices or other UEs.

In another embodiment, the UE may be configured, by a moving communication device such as an aTRP for example, to steer the beam in the uplink direction according to a certain trajectory. The configured trajectory can be the same as a pre-defined device trajectory for one or more aTRPs, for example. The UE may then maintain such a trajectory for the steered beam, notwithstanding potentially sporadic changes in UE direction and/or velocity.

On the other hand, an aTRP mobility pattern may not perfectly match a pre-configured trajectory. For example, as noted elsewhere herein, an aTRP may need to slightly change its direction to avoid a collision. Given that the aTRP knows its own actual trajectory, it may send beam tracking feedback to one or more UEs to help the UE(s) align the steered beam(s).

Uplink embodiments consistent with the present disclosure may provide a simple beam tracking solution for the uplink direction, potentially in the absence of an accurate estimate of aTRP position or trajectory at the UE, while maintaining a low complexity for both the UE(s) and the aTRP(s). As for downlink embodiments, uplink embodiments may be useful in reducing beam failure rate by detecting beam misalignments in advance, before a beam failure occurs.

Figure 9:
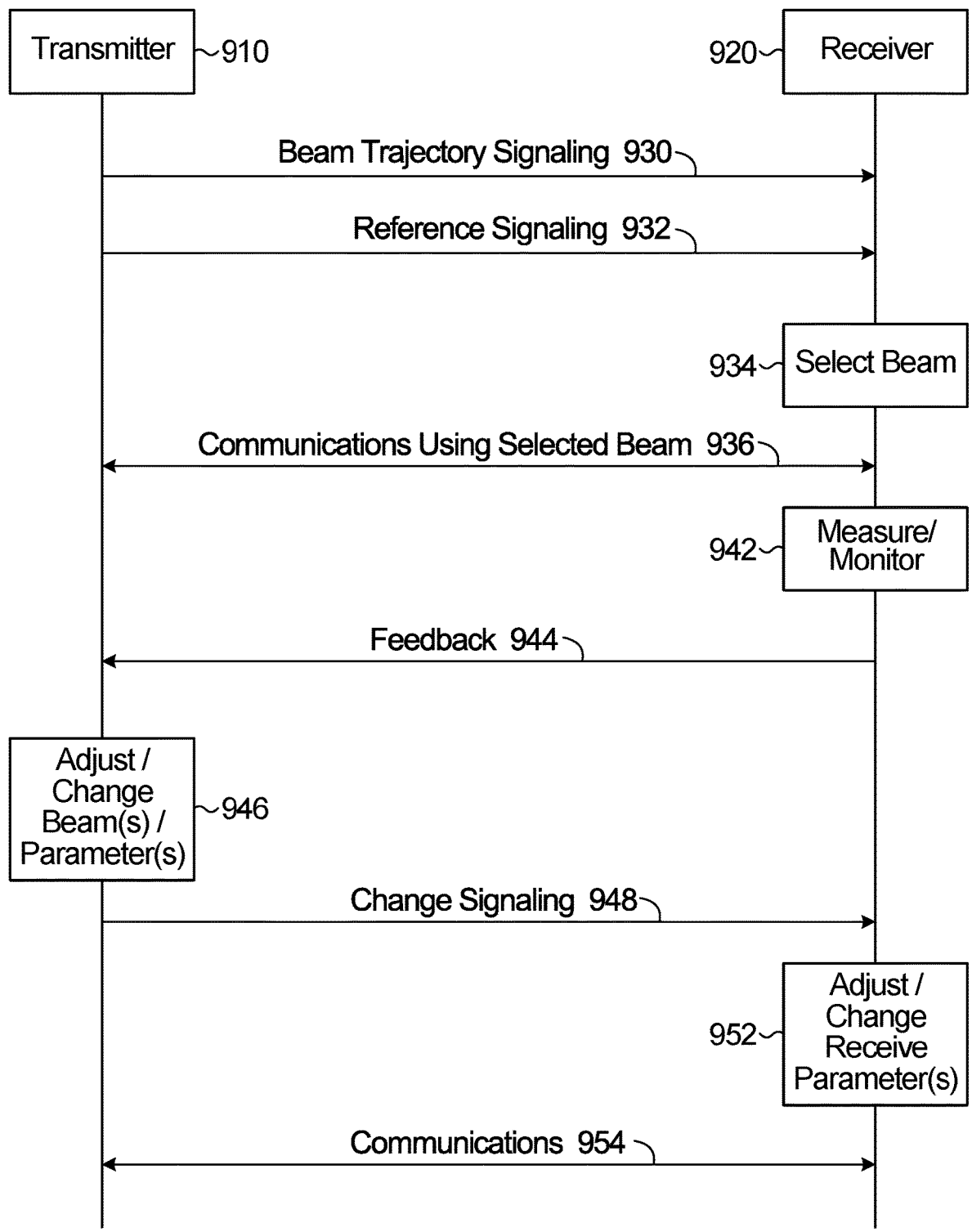
FIG. 9 is a signal flow diagram illustrating signaling and communications according to an embodiment.

The foregoing description and the above-referenced drawings are illustrative of various embodiments. These embodiments include, for example, methods that involve communicating signaling related to an antenna beam, and using an antenna beam for subsequent directional communications. FIG. 9 is a signal flow diagram illustrating signaling and communications according to an embodiment.

FIG. 9 illustrates a general case of a transmitter 910 and a receiver 920, either or both of which may be moving. For example, in an embodiment the transmitter 910 is a moving network device such as an aTRP and the receiver 920 is a UE. In another embodiment the transmitter 910 is a UE and the receiver 920 is a moving network device. The transmitter 910 and the receiver 920 may both be UEs.

Transmission of beam trajectory signaling 930 by the transmitter 910 and reception of the beam trajectory signaling by the receiver 920 are illustrative of communicating signaling that is indicative of a beam trajectory along which an antenna beam that is associated with a moving communication device is moving. The moving communication device is moving along a device trajectory, which may or may not be the same as the beam trajectory.

Communicating beam trajectory signaling is not necessarily limited only to transmitting signaling. From the perspective of the receiver 920, for example, communicating the beam trajectory signaling 930 involves receiving the signaling. Also, in some embodiments the transmitter 910 may be stationary and the receiver 920 may be moving. Even in such embodiments, an antenna beam for which beam trajectory signaling 930 is communicated may be considered to be associated with the moving communication device, which in this example is the receiver 920, in the sense that the antenna beam is at least a candidate beam for selection by the receiver for use in subsequent directional communications with the transmitter 910. An antenna beam trajectory may be determined or intended to follow the device trajectory of a moving receiver, which illustrates another example of how an antenna beam may also or instead be associated with a moving receiver.

A beam trajectory, or similarly a device trajectory, may be described, specified, or characterized in any of various ways. For example, in some embodiments a beam trajectory is consistent with a trajectory pattern, and the beam trajectory signaling at 930 is indicative of characterizing parameters for the trajectory pattern. Examples of a trajectory pattern include the following, which are also described in further detail elsewhere herein: a fixed footprint with the characterizing parameters including a center point and a coverage radius; a linear pattern with the characterizing parameters including a speed and a direction of movement; a circular pattern with the characterizing parameters including a center point, a radius, and a linear speed or a time period to traverse the circular pattern; and an elliptic pattern with the characterizing parameters including locations of two focal points, focal distance, and a linear speed or a time period to traverse the elliptic pattern.

Antenna beam selection at the receiver 920 is illustrated at 934, and the selected antenna beam is used for subsequent directional communications between the transmitter and the receiver at 936. In general, such antenna beam selection is based at least in part on the beam trajectory that is signaled at 930. In the example shown, a method at the receiver 920 involves selecting the antenna beam at 934. Even though the transmitter 910 might not itself select the antenna beam based on beam trajectory, the antenna beam is selected for use for the subsequent directional communications 936, at the receiver 920 in this example, based on the beam trajectory.

In some embodiments, antenna beam selection may also or instead be based on one or more other conditions, criteria, or parameters. FIG. 9 illustrates one example, in which reference signaling 932 is transmitted by the transmitter 910 and received by the receiver 920, and one or more measurements such as a signal power measurement may be made at the receiver. Such measurement(s) may be used in selecting the antenna beam at 934.

The antenna beam is selected for use for the subsequent directional communications in some embodiments based on the beam trajectory and a mobility-aware criterion. Examples of a mobility-aware criterion include the following, which are also described elsewhere herein and any one or more of which may be used in antenna beam selection: a criterion based on comparing a velocity of the UE and a velocity of the beam according to the beam trajectory; a criterion based on alignment between the beam trajectory a mobility pattern of the UE; and a criterion based on coverage time duration for the UE by the antenna beam.

The communications at 936 are shown as bidirectional in FIG. 9, but this is just an example. In some embodiments, communications are only in the direction of the beam trajectory signaling. For example, a method may involve communicating signaling indicative of a beam trajectory from a moving communication device to a UE, and the subsequent directional communications are communications from the moving communication device to the UE. According to another embodiment, a method involves communicating signaling indicative of a beam trajectory from a UE to a moving communication device, and the subsequent directional communications are communications from the UE to the moving communication device. If reciprocity exists, then signaling at 930 and communications at 936 may be in opposite directions, or an antenna beam that is selected based at least in part on signaling in one direction at 930 may be used for bidirectional communications at 936. In another embodiment, beam trajectory signaling may be communicated bidirectionally to establish bidirectional communications using different antenna beams.

Antenna beam selection at 934 is not necessarily a fixed and final selection. For example, there may be periodic or otherwise ongoing measurements or monitoring at 942 associated with the communications 936. Measurements or monitoring at 942 may also or instead involve further beam trajectory signaling and/or reference signaling (not shown) associated with one or more antenna beams that may or may not be associated with the transmitter 910.

In an embodiment, a method involves determining, at 942, beam alignment relative to the antenna beam based on the beam trajectory. For example, the beam alignment may be determined based on any one or more of: a difference between a velocity vector and the beam trajectory; and a difference between a receiver location and a beam center of the antenna beam. An example of beam alignment determination based on a difference between a velocity vector and the beam trajectory involves taking a norm of the difference and determining whether the norm is greater than a threshold. Examples of a difference between a receiver location and a beam center of the antenna beam include displacement or offset as described in further detail elsewhere herein.

Beam alignment may also or instead be determined based on one or more other conditions, such as received signal power associated with the antenna beam.

Some embodiments may involve predicting a receive parameter associated with the antenna beam based on the beam trajectory. One example of a receive parameter is a coverage duration for the receiver 920, which may be predicted based on the beam trajectory, a mobility pattern of the receiver, and a mobility pattern of the transmitter 910 of the antenna beam, as described in detail elsewhere herein.

One or more other parameters may also or instead be predicted or otherwise determined. For example, in some embodiments a method involves predicting an AoA of the antenna beam at the receiver 920, based on a mobility pattern of the receiver and a mobility pattern of a transmitter of the antenna beam, as also described in detail elsewhere herein. Any of various operations may be performed based on the AoA. Examples disclosed herein include the following, any one or more of which may be performed: adjusting a receive beam direction at the receiver 920 based on the AoA; adjusting a receive beam width at the receiver based on the AoA; adjusting a receive array gain at the receiver based on the AoA; adjusting, at the receiver based on the AoA, a threshold to detect a misalignment relative to the antenna beam; and switching between different antenna panels at the receiver based on the AoA.

Some embodiments may involve communicating, between a UE and a moving communication device for example, signaling indicative of a receive parameter that is associated with the antenna beam and is predicted by a receiver of the antenna beam. This is illustrated by way of example in FIG. 9 at 944, as feedback that is transmitted by the receiver 920 and received by the transmitter 910. One or parameters of the antenna beam may be adjusted at the transmitter 910 beam based on the receive parameter, and this is also shown in FIG. 9 at 946.

Examples of adjustments or changes that may be made at the transmitter 910 based on a receive parameter, or more generally based on feedback that is communicated from the receiver 920 to the transmitter, are described elsewhere herein. These examples include at least the following, and in some embodiments a method involves any one or more of: shifting the antenna beam towards a certain direction based on the feedback; switching the receiver to a different antenna beam based on the feedback; switching the receiver to a different transmitter based on the feedback; adjusting a transmit beam width at the transmitter based on the feedback; adjusting an AoD of the beam at the transmitter based on the feedback; adjusting an estimate, at the transmitter, of velocity of the receiver; and adjusting an estimate, at the transmitter, of location of the receiver.

Adjustments or changes that are made at the transmitter 910 may affect receiver operation. For example, a determination may be made by the transmitter 910 or a network device that the receiver 920 is to be switched to a different antenna beam or a different transmitter. Change signaling indicative of such a change is shown by way of example as being transmitted by the transmitter 910 and received by the receiver 920 at 948. One or more other network devices or components may also or instead be involved in determining that an adjustment or change should be made and/or in communicating change signaling to the receiver 920.

Adjustments or changes may also or instead be made at the receiver 920, as shown at 952. Receiver adjustments or changes may be responsive to change signaling such as the change signaling shown at 948, or otherwise determined at the receiver 920. For example, the receiver 920 may also or instead adjust one or more receive parameters as a result of making measurements at 942. In some embodiments, change signaling (not shown) related to adjustments or changes at the receiver 920 may be transmitted to and received by the transmitter 910 so that any appropriate adjustments or changes may be made at the transmitter.

In the event of an adjustment or change, whether made at the transmitter 910, the receiver 920, or both, and whether or not an adjustment or change involves change signaling in either direction or both directions between the transmitter and the receiver, communications may proceed as shown at 954.

FIG. 9 is intended solely for illustrative purposes. Other embodiments may involve additional, fewer, and/or different operations, performed in a similar or different order than shown. For example, a method may involve communicating, between a transmitter and a receiver such as a UE and a moving communication device, signaling indicative of the device trajectory along which the moving communication device is moving. The device trajectory may be or include a periodic trajectory of the moving communication device, in which case a method may also involve predicting a receive parameter associated with the antenna beam based on the periodic trajectory of the moving communication device.

Another possible variation involves estimation of a device trajectory of a moving communication device. This may be particularly useful in at least certain applications, such as extending embodiments of the present disclosure to beam tracking in the uplink direction for communications from a UE to a mobile network device such as an aTRP. For example, an embodiment may involve estimating or otherwise determining the aTRP device trajectory at a UE, and using the estimated device trajectory to steer an antenna beam in the uplink direction. The aTRP device trajectory, or information from which the device trajectory can be determined, may be signaled to the UE by the aTRP itself, or by another network device or component. The beam trajectory of the steered beam, which is determined based on an aTRP device trajectory in this example, may be signaled to one or more aTRPs by the UE, as shown at 930 for example, and the UE may optionally signal its own trajectory to the aTRP(s). A receiving aTRP may detect a misalignment if the steered beam deviates from the device trajectory of the aTRP, using any of the alignment/misalignment determination techniques described herein for example. Beam tracking feedback may be sent by a receiving aTRP to assist the UE in adjusting one or more parameters such as beam width and/or beam direction.

According to another embodiment, which may also provide a useful approach to mobility-aware beam tracking in the uplink direction, a UE is configured by a network device to steer an antenna beam in the uplink direction according to a certain beam trajectory. In this case, the beam trajectory is signaled to the UE to configure the UE to steer the antenna beam. The UE may optionally signal the beam trajectory at 930 and its own device trajectory to one or more aTRPs, and its trajectory to the aTRPs. As above, a receiving aTRP may detect a misalignment using any of the alignment/misalignment determination techniques described herein, and beam tracking feedback may be sent by a receiving aTRP to assist the UE in adjusting one or more parameters such as beam width and/or beam direction.

Figure 10A:
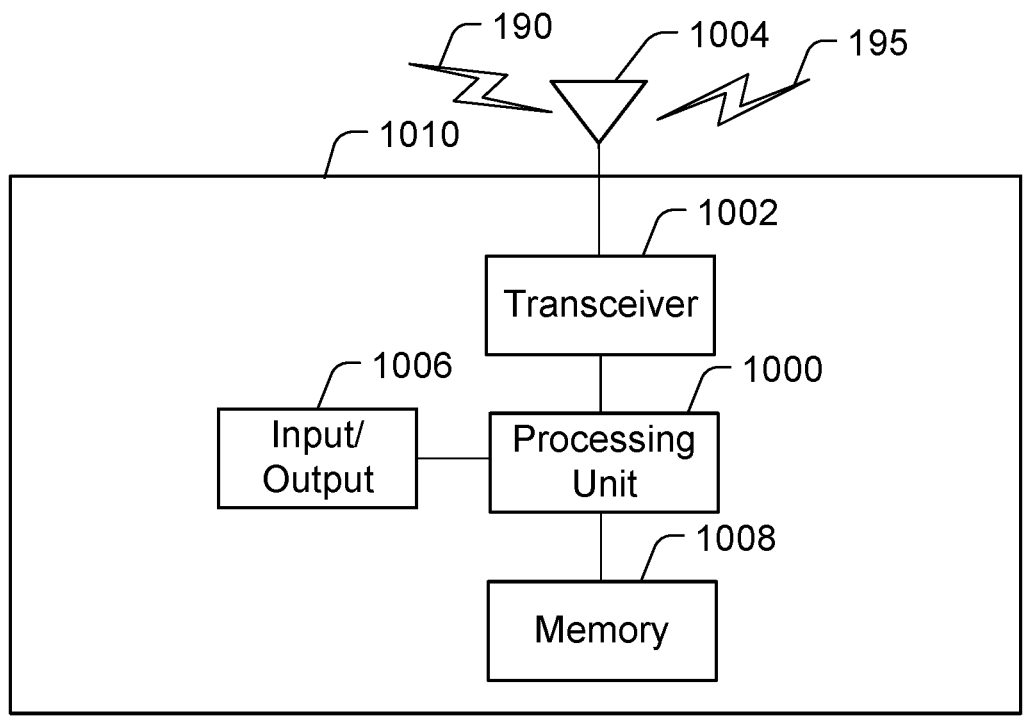
FIGS. 10A and 10B are block diagrams illustrating example devices that may implement the methods and teachings according to this disclosure.
Figure 10B:
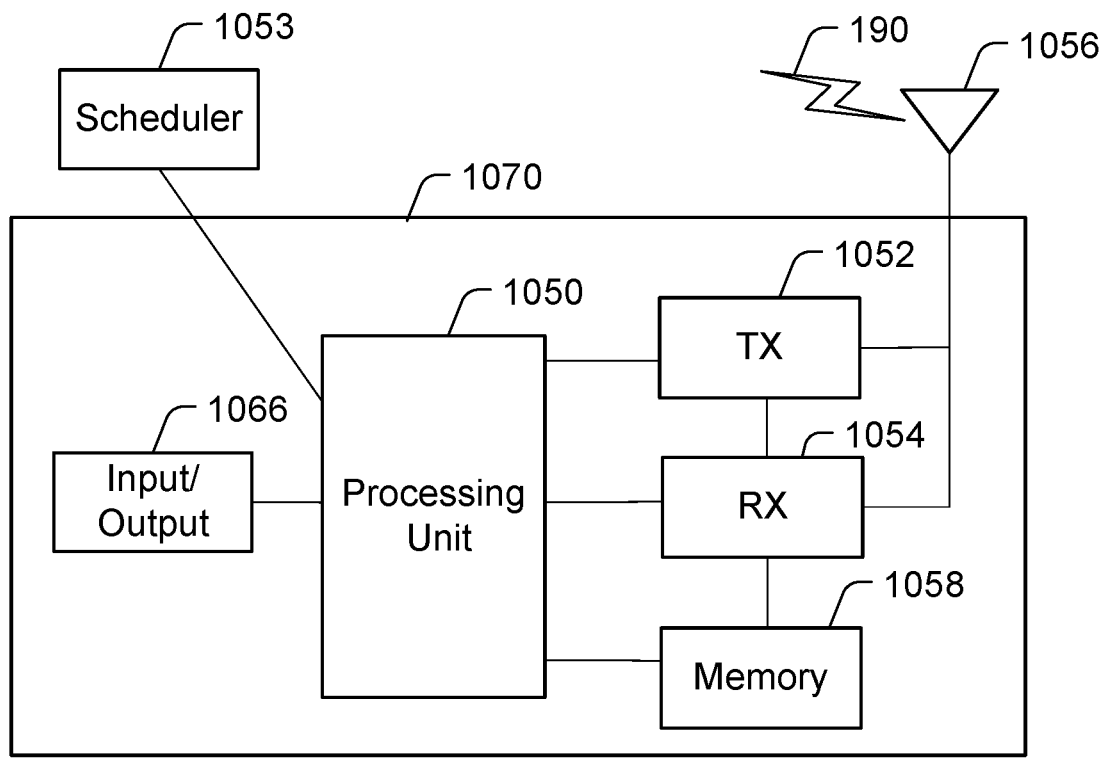

Other embodiments, such as apparatus embodiments, are also possible. FIGS. 10A and 10B illustrate, in another form, example devices that may implement features according to this disclosure.

FIG. 10A illustrates an example ED 1010, and FIG. 10B illustrates an example base station 1070. These components could be used in the system 100 (FIG. 1) or in any other suitable system.

As shown in FIG. 10A, the ED 1010 includes at least one processing unit 1000. The processing unit 1000 implements various processing operations of the ED 1010. For example, the processing unit 1000 could perform signal coding, data processing, power control, input processing, output processing, or any other functionality enabling the ED 1010 to operate in a communication system. The processing unit 1000 may also be configured to implement some or all of the functionality or embodiments described in more detail herein. Each processing unit 1000 includes any suitable processing or computing device configured to perform one or more operations. Each processing unit 1000 could, for example, include a microprocessor, microcontroller, digital signal processor, field programmable gate array, or application specific integrated circuit.

The ED 1010 also includes at least one transceiver 1002. The transceiver 1002 is configured to modulate data or other content for transmission by at least one antenna or NIC (Network Interface Controller) 1004. The transceiver 1002 is also configured to demodulate data or other content received by the at least one antenna 1004. Each transceiver 1002 includes any suitable structure for generating signals for wireless transmission and/or processing signals received wirelessly or by wire. Each antenna 1004 includes any suitable structure for transmitting and/or receiving wireless signals. One or multiple transceivers 1002 could be used in the ED 1010, and one or multiple antennas 1004 could be used in the ED 1010. Although shown as a single functional unit, a transceiver 1002 could be implemented using at least one transmitter and at least one separate receiver.

The ED 1010 further includes one or more input/output devices 1006 or interfaces. The input/output devices 1006 facilitate interaction with a user or other devices (network communications) in the network. Each input/output device 1006 includes any suitable structure for providing information to or receiving/providing information from a user, such as a speaker, microphone, keypad, keyboard, display, or touch screen, including network interface communications.

In addition, the ED 1010 includes at least one memory 1008. The memory 1008 stores instructions and data used, generated, or collected by the ED 1010. For example, the memory 1008 could store software instructions or modules configured to implement some or all of the functionality or embodiments described above and that are executed by the processing unit(s) 1000. Each memory 1008 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 10B, the base station 1070 includes at least one processing unit 1050, at least one transmitter 1052, at least one receiver 1054, one or more antennas 1056, at least one memory 1058, and one or more input/output devices or interfaces 1066. A transceiver, not shown, may be used instead of the transmitter 1052 and receiver 1054. A scheduler 1053 may be coupled to the processing unit 1050. The scheduler 1053 may be included within or operated separately from the base station 1070. The processing unit 1050 implements various processing operations of the base station 1070, such as signal coding, data processing, power control, input processing, output processing, or any other functionality. The processing unit 1050 can also be configured to implement some or all of the functionality or embodiments described in more detail herein. Each processing unit 1050 includes any suitable processing or computing device configured to perform one or more operations. Each processing unit 1050 could, for example, include a microprocessor, microcontroller, digital signal processor, field programmable gate array, or application specific integrated circuit.

Each transmitter 1052 includes any suitable structure for generating signals for wireless transmission to one or more EDs or other devices. Each receiver 1054 includes any suitable structure for processing signals received wirelessly or by wire from one or more EDs or other devices. Although shown as separate components, at least one transmitter 1052 and at least one receiver 1054 could be combined into a transceiver. Each antenna 1056 includes any suitable structure for transmitting, receiving, or both transmitting and receiving wireless signals. While a common antenna 1056 is shown here as being coupled to both the transmitter 1052 and the receiver 1054, one or more antennas 1056 could be coupled to the transmitter(s) 1052, and one or more separate antennas 1056 could be coupled to the receiver(s) 1054. Each memory 1058 includes any suitable volatile and/or non-volatile storage and retrieval device(s) such as those described above in connection to the ED 1010. The memory 1058 stores instructions and data used, generated, or collected by the base station 1070. For example, the memory 1058 could store software instructions or modules configured to implement some or all of the functionality or embodiments described herein and that are executed by the processing unit(s) 1050.

Each input/output device 1066 facilitates interaction with a user or other devices (network communications) in the network. Each input/output device 1066 includes any suitable structure for providing information to or receiving/providing information from a user, including network interface communications.

It should be appreciated that one or more embodiments disclosed herein, including method embodiments or apparatus embodiments, may be implemented by corresponding units or modules. For example, a signal may be transmitted by a transmitting unit or a transmitting module. A signal may be received by a receiving unit or a receiving module. A signal may be processed by a processing unit or a processing module. Other features may be performed by these or other modules. The respective units or modules may be implemented using hardware, components that execute software, or a combination thereof. For instance, one or more of the units or modules may be or include one or more integrated circuits, such as field programmable gate arrays (FPGAs) or application-specific integrated circuits (ASICs). It will be appreciated that where the modules are implemented using software, they may be retrieved by a processor, in whole or part as needed, individually or together for processing, in single or multiple instances, and that the modules themselves may include instructions for further deployment and instantiation.

In general, hardware, firmware, components which execute software, or some combination thereof could be used in implementing features disclosed herein. Electronic devices that might be suitable for implementing any or all of these components include, among others, microprocessors, microcontrollers, Programmable Logic Devices (PLDs), Field Programmable Gate Arrays (FPGAs), Application Specific Integrated Circuits (ASICs), and other types of "intelligent" integrated circuits.

Any of various types of memory devices could be implemented. Either or both of the memory 1008 and the memory 1058, for example, could include one or more physical memory devices. Solid-state memory devices such as a Flash memory device could be implemented. Memory devices with movable or even removable storage media could also or instead be implemented.

FIG. 10A and FIG. 10B illustrate examples of a UE and a network device, respectively, in which embodiments could be implemented. More generally, an apparatus may include a processor and a non-transitory computer readable storage medium, such as the processing unit 1000, 1050 and memory 1008, 1058 in FIG. 10A or FIG. 10B. Such an apparatus may be a UE. Another example of an apparatus is network equipment, which may be a gNB, a TRP, a base station, or any other type of network device or equipment referenced herein. Other components, such as a communication interface to which the processor is coupled, may also be provided. Elements 1002, 1004, 1052, 1054, 1056 in FIGS. 10A and 10B are examples of communication interfaces that may be provided in some embodiments.

In an embodiment, the storage medium stores programming for execution by the processor, and the programming includes instructions to perform a method as disclosed herein. For example, the instructions, when executed by a processor, may cause the processor to perform any of various operations.

Another embodiment relates to a computer program product that includes a non-transitory computer readable storage medium storing programming. The programming includes instructions to perform a method as disclosed herein.

In some embodiments, the programming includes instructions to, or to cause a processor to, communicate, between a UE and a moving communication device in a wireless communication network, signaling indicative of a beam trajectory along which an antenna beam that is associated with the moving communication device is moving, the moving communication device moving along a device trajectory; and use the antenna beam for subsequent directional communications between the UE and the moving communication device.

Some embodiments include any one or more of the following features, in any of various combinations:
  the antenna beam is selected for use for the subsequent directional communications, based on the beam trajectory and a mobility-aware criterion;
  the mobility-aware criterion is or includes any one or more of: a criterion based on comparing a velocity of the UE and a velocity of the beam according to the beam trajectory; a criterion based on alignment between the beam trajectory a mobility pattern of the UE; and a criterion based on coverage time duration for the UE by the antenna beam;
  the beam trajectory is consistent with a trajectory pattern;
  the signaling is indicative of characterizing parameters for the trajectory pattern;
  the trajectory pattern is or includes any one of: a fixed footprint with the characterizing parameters including a center point and a coverage radius; a linear pattern with the characterizing parameters including a speed and a direction of movement; a circular pattern with the characterizing parameters including a center point, a radius, and a linear speed or a time period to traverse the circular pattern; and an elliptic pattern with the characterizing parameters including locations of two focal points, focal distance, and a linear speed or a time period to traverse the elliptic pattern;
  the programming further includes instructions to, or to cause a processor to, determine beam alignment relative to the antenna beam based on the beam trajectory;
  the beam alignment is determined based on any one or more of: a difference between a velocity vector and the beam trajectory; and a difference between a receiver location and a beam center of the antenna beam;
  the beam alignment is further determined based on received signal power associated with the antenna beam;
  the programming further includes instructions to, or to cause a processor to, predict a receive parameter associated with the antenna beam based on the beam trajectory;
  the receive parameter is or includes a coverage duration for a receiver, predicted based on the beam trajectory, a mobility pattern of the receiver, and a mobility pattern of a transmitter of the antenna beam;
  the programming further includes instructions to, or to cause a processor to, predict an AoA of the antenna beam at a receiver, based on a mobility pattern of the receiver and a mobility pattern of a transmitter of the antenna beam;
  the programming further includes instructions to, or to cause a processor to, perform any one or more of the following: adjust a receive beam direction at the receiver based on the AoA; adjust a receive beam width at the receiver based on the AoA; adjust a receive array gain at the receiver based on the AoA; adjust, at the receiver based on the AoA, a threshold to detect a misalignment relative to the antenna beam; switch between different antenna panels at the receiver based on the AoA;
  the programming further includes instructions to, or to cause a processor to, communicate, between the UE and the moving communication device, signaling indicative of a receive parameter that is associated with the antenna beam and is predicted by a receiver of the antenna beam;
  the programming further includes instructions to, or to cause a processor to, adjust a parameter of the antenna beam at a transmitter of the antenna beam based on the receive parameter;
  the programming further includes instructions to, or to cause a processor to, communicate, between the UE and the moving communication device, signaling indicative of the device trajectory;
  the device trajectory is or includes a periodic trajectory of the moving communication device;
  the programming further includes instructions to, or to cause a processor to, predict a receive parameter associated with the antenna beam based on the periodic trajectory of the moving communication device;

the programming further includes instructions to, or to cause a processor to, communicate, between the UE and the moving communication device, feedback from a receiver to a transmitter of the antenna beam;

the programming further includes instructions to, or to cause a processor to, perform any one or more of the following: shift the antenna beam towards a certain direction based on the feedback; switch the receiver to a different antenna beam based on the feedback; switch the receiver to a different transmitter based on the feedback; adjust a transmit beam width at the transmitter based on the feedback; adjust an AoD of the beam at the transmitter based on the feedback; adjust an estimate, at the transmitter, of velocity of the receiver; adjust an estimate, at the transmitter, of location of the receiver;

the apparatus is implemented at the moving communication device;

the instructions include instructions to, or to cause a processor to, communicate the signaling from the moving communication device to the UE;

the subsequent directional communications are communications from the moving communication device to the UE;

the apparatus is implemented at the UE;

the instructions include instructions to, or to cause a processor to, communicate the signaling from the UE to the moving communication device;

the subsequent directional communications are communications from the UE to the moving communication device.

Other features that could be implemented in apparatus embodiments or in non-transitory computer readable storage medium embodiments could be or become apparent, for example, from the method embodiments disclosed herein. Features disclosed in the context of any embodiment are not necessarily exclusive to that particular embodiment, and may also or instead be applied to other embodiments.

In some embodiments, beams are steered according to certain predefined trajectories. The trajectory for each beam can be described in terms of certain parameters such as speed, direction, etc., which can be signaled to receivers such as UEs, through SIB or RRC signaling for example. A transmitter, such as an aTRP, may maintain the predefined trajectory for each beam notwithstanding its own mobility pattern, which can be the same or different from the mobility pattern(s) of the projected beam(s).

Some embodiments may provide UEs with beam trajectories, and potentially moving network device trajectories, in the downlink direction. This may enable a UE, in idle mode for example, to choose a network device and beam which best align with the mobility pattern of the UE. A UE may also or instead choose a network device and beam that are expected to result in maximum coverage duration. Other beam selection criteria may also or instead be used.

Knowledge of beam trajectory at a receiver node may enable such features as detecting beam misalignment in advance, before a beam failure occurs, by a receiver node such as a UE.

Some embodiments involve receiver nodes to predict such parameters as AoA in advance, over an upcoming time interval, by exploiting knowledge of mobility patterns. A receiver node may adaptively adjust receive beam direction, adaptively switch between different antenna panels, or include expected coverage time and/or periodicity in measurement reports, for example. Other examples of receiver-side actions are also described herein.

Providing a transmitter with feedback may support such features as any one or more of: adjusting the transmit beam width and/or direction; and classifying or reclassifying receiver nodes into a number of beamforming groups, each group being served with a dedicated beam. Other examples of transmitter-side actions are also described herein.

With multi-user beam tracking using feedback for example, receiver nodes may be classified into a number of beamforming groups at a transmitter, based on similarity in their mobility patterns.

These and other features are discussed in detail at least above.

What has been described is merely illustrative of the application of principles of embodiments of the present disclosure. Other arrangements and methods can be implemented by those skilled in the art.

For example, although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment could be combined with selected features of other example embodiments.

Potential benefits of at least some of the disclosed embodiments may include, for example, reducing beam failure rate by detecting misalignments in advance, before a beam failure occurs.

Another potential benefit relates to enhancing beam tracking, potentially in the absence of an accurate estimate of UE position or mobility for moving communication devices, by enabling UEs to detect misalignments in advance. UEs may signal moving communication devices on how to adjust one or more parameters such as transmit beam width or direction.

Coverage time may potentially be increased, thereby potentially reducing beam switching and failure, by exploiting knowledge of the mobility patterns Embodiments consistent with the present disclosure may reduce signaling and overhead compared to traditional beam tracking and refinement, by enabling receivers such as UEs to adjust their receive beam direction for example. The rate of measurement reports may potentially be reduced by including expected coverage duration or periodicity in the reports. Multi-user beam tracking rather than per-user beam tracking may also or instead contribute to lower signaling and overhead. Use of beamforming groups for users with similar mobility may not only help reduce signaling and overhead, but may also provide longer coverage.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

For example, embodiments are presented primarily in the context of beam tracking in the presence of aTRPs. In other embodiments, the same or similar features may be applied to beam tracking in the presence of aerial UEs being served by fixed or aerial TRPs, for example.

Consider, as an illustrative example, an application to beam tracking in the downlink direction. A network device may employ a number of certain device trajectories, and may signal those device trajectories to the aerial UEs. The device trajectories may follow the paths that aerial UEs are configured to fly. Each aerial UE may also or instead inform a network device of its device trajectory, such as a long-term device trajectory, so that the network device may maintain the same beam trajectory for a steered beam in the downlink direction. In any case, there may be sporadic changes in the device trajectory of the aerial UEs, because of turbulence or to avoid collisions for example, so that the aerial UEs may deviate from the steered beam. In this case, an aerial UE may detect misalignment by exploiting knowledge of the beam trajectory, and may then provide the network device with feedback so as to assist the network device with aligning the steered beam. Other features, related to misalignment detection and/or other aspects of the present disclosure such as AoA prediction, may be provided in the same or similar ways as presented in other embodiments.

Although aspects of the present invention have been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although embodiments and potential advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

In addition, although described primarily in the context of methods and apparatus, other implementations are also contemplated, as instructions stored on a non-transitory computer-readable medium, for example. Such media could store programming or instructions to perform any of various methods consistent with the present disclosure.

Moreover, any module, component, or device exemplified herein that executes instructions may include or otherwise have access to a non-transitory computer readable or processor readable storage medium or media for storage of information, such as computer readable or processor readable instructions, data structures, program modules, and/or other data. A non-exhaustive list of examples of non-transitory computer readable or processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and nonremovable media implemented in any method or technology, random-access memory (RAM), read-only memory (ROM), electrically erasable programmable read-only memory (EEPROM), flash memory or other memory technology. Any such non-transitory computer readable or processor readable storage media may be part of a device or accessible or connectable thereto. Any application or module herein described may be implemented using instructions that are readable and executable by a computer or processor may be stored or otherwise held by such non-transitory computer readable or processor readable storage media.

What is claimed is:

1. A method comprising:
    communicating, between a User Equipment (UE) and a moving communication device in a wireless communication network,
    signaling that comprises parameters to indicate to a receiver of the signaling a beam trajectory of an antenna beam that is associated with the moving communication device, wherein the antenna beam follows the beam trajectory and the moving communication device follows a device trajectory, and wherein the beam trajectory followed by the antenna beam is defined separately from the device trajectory followed by the moving communication device;
    using the antenna beam for subsequent directional communications between the UE and the moving communication device; and
    determining beam misalignment of the antenna beam based on a difference between a velocity vector of the UE and the beam trajectory having a magnitude that is greater than a threshold.

2. The method of claim 1, wherein
    the antenna beam is selected from a plurality of candidate antenna beams, based on alignment between the beam trajectory and a mobility pattern of the UE.

3. The method of claim 1, wherein the beam trajectory is consistent with a trajectory pattern, wherein the parameters comprise characterizing parameters for the trajectory pattern.

4. The method of claim 1, wherein the beam misalignment is further determined based on received signal power associated with the antenna beam.

5. The method of claim 1, further comprising:
    predicting a receive parameter associated with the antenna beam based on the beam trajectory and a mobility pattern of a receiver of the antenna beam.

6. The method of claim 1, further comprising:
    predicting an Angle of Arrival (AoA) of the antenna beam at a receiver, based on a mobility pattern of the receiver and a mobility pattern of a transmitter of the antenna beam.

7. The method of claim 1, further comprising:
    communicating, between the UE and the moving communication device, signaling indicative of a receive parameter that is associated with the antenna beam and is predicted by a receiver of the antenna beam based on the beam trajectory and a mobility pattern of the receiver of the antenna beam.

8. The method of claim 1, further comprising:
    communicating, between the UE and the moving communication device, feedback from a receiver to a transmitter of the antenna beam, wherein the feedback is determined based on the beam trajectory.

9. The method of claim 1, wherein communicating signaling comprises communicating the signaling from the moving communication device to the UE, wherein the subsequent directional communications are communications from the moving communication device to the UE.

10. The method of claim 1, wherein communicating signaling indicative of a beam trajectory comprises communicating the signaling from the UE to the moving communication device, wherein the subsequent directional communications are communications from the UE to the moving communication device.

11. The method of claim 1, wherein the moving communication device is a moving network device.

12. The method of claim 1, further comprising:
communicating, between the UE and the moving communication device, signaling indicative of the device trajectory.

13. The method of claim 12,
the device trajectory comprising a periodic trajectory followed by the moving communication device;
the method further comprising:
predicting a receive parameter associated with the antenna beam based on the periodic trajectory.

14. The method of claim 1, wherein the beam trajectory is independent from the device trajectory.

15. The method of claim 1, wherein the antenna beam follows the beam trajectory notwithstanding the device trajectory.

16. The method of claim 1, wherein the beam trajectory is decoupled from the device trajectory.

17. The method of claim 1, wherein the antenna beam follows the beam trajectory in that a beam footprint projected by the antenna beam traverses the beam trajectory.

18. The method of claim 1, wherein the beam trajectory specifies a direction, path, or pattern along which a beam footprint of the antenna beam traverses when projected, and a measure of how quickly the antenna beam is moving.

19. The method of claim 18, wherein the measure of how quickly the antenna beam is moving comprises a traversal speed or a traversal time.

20. An apparatus comprising:
a communication interface;
a processor, coupled to the communication interface;
a non-transitory computer readable storage medium, coupled to the processor, storing programming for execution by the processor, the programming including instructions to: communicate, between a User Equipment (UE) and a moving communication device in a wireless communication network, signaling that comprises parameters to indicate to a receiver of the signaling a beam trajectory of an antenna beam that is associated with the moving communication device, wherein the antenna beam follows the beam trajectory and the moving communication device follows a device trajectory, and wherein the beam trajectory followed by the antenna beam is defined separately from the device trajectory followed by the moving communication device;
use the antenna beam for subsequent directional communications between the UE and the moving communication device; and
determine beam misalignment of the antenna beam based on a difference between a velocity vector of the UE and the beam trajectory having a magnitude that is greater than a threshold.

21. The apparatus of claim 20, wherein the antenna beam is selected from a plurality of candidate antenna beams, based on alignment between the beam trajectory and a mobility pattern of the UE.

22. The apparatus of claim 20, wherein the beam trajectory is consistent with a trajectory pattern, wherein the parameters comprise characterizing parameters for the trajectory pattern.

23. The apparatus of claim 20, wherein the beam misalignment is further determined based on received signal power associated with the antenna beam.

24. The apparatus of claim 20, the programming further including instructions to:
predict a receive parameter associated with the antenna beam based on the beam trajectory and a mobility pattern of a receiver of the antenna beam.

25. The apparatus of claim 20, the programming further including instructions to:
predict an Angle of Arrival (AoA) of the antenna beam at a receiver, based on a mobility pattern of the receiver and a mobility pattern of a transmitter of the antenna beam.

26. The apparatus of claim 20, the programming further including instructions to:
communicate, between the UE and the moving communication device, signaling indicative of a receive parameter that is associated with the antenna beam and is predicted by a receiver of the antenna beam based on the beam trajectory and a mobility pattern of the receiver of the antenna beam.

27. The apparatus of claim 20, the programming further including instructions to:
communicate, between the UE and the moving communication device, signaling indicative of the device trajectory, the device trajectory comprising a periodic trajectory followed by the moving communication device;
predict a receive parameter associated with the antenna beam based on the periodic trajectory.

28. The apparatus of claim 20, the programming further including instructions to:
communicate, between the UE and the moving communication device, feedback from a receiver to a transmitter of the antenna beam, wherein the feedback is determined based on the beam trajectory.

29. The apparatus of claim 20, implemented at the moving communication device, wherein the instructions comprise instructions to communicate the signaling from the moving communication device to the UE, wherein the subsequent directional communications are communications from the moving communication device to the UE.

30. The apparatus of claim 20, implemented at the UE, wherein the instructions comprise instructions to communicate the signaling from the UE to the moving communication device, wherein the subsequent directional communications are communications from the UE to the moving communication device.

31. A computer program product comprising a non-transitory computer readable storage medium storing programming, the programming including instructions to:
communicate, between a User Equipment (UE) and a moving communication device in a wireless communication network,
signaling that comprises parameters to indicate to a receiver of the signaling a beam trajectory of an antenna beam that is associated with the moving communication device, wherein the antenna beam follows the beam trajectory and the moving communication device follows a device trajectory, and wherein the beam trajectory followed by the antenna beam is defined separately from the device trajectory followed by the moving communication device;

use the antenna beam for subsequent directional communications between the UE and the moving communication device; and determine beam misalignment of the antenna beam based on a difference between a velocity vector of the UE and the beam trajectory having a magnitude that is greater than a threshold.

* * * * *